United States Patent
Pascolini et al.

(10) Patent No.: US 10,484,112 B2
(45) Date of Patent: Nov. 19, 2019

(54) DYNAMICALLY ADJUSTABLE ANTENNAS FOR WEARABLE DEVICES

(71) Applicant: Apple Inc., Cupertino, CA (US)

(72) Inventors: Mattia Pascolini, San Francisco, CA (US); Eduardo Jorge da Costa Bras Lima, Sunnyvale, CA (US); Carlo Di Nallo, San Carlos, CA (US); Andrea Ruaro, Copenhagen (DK); Mario Martinis, Cupertino, CA (US); Zheyu Wang, Sunnyvale, CA (US); Jayesh Nath, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 15/442,463

(22) Filed: Feb. 24, 2017

(65) Prior Publication Data

US 2018/0248634 A1    Aug. 30, 2018

(51) Int. Cl.
- *H04B 17/318* (2015.01)
- *H01Q 1/27* (2006.01)
- *H04B 1/3827* (2015.01)

(52) U.S. Cl.
CPC .......... *H04B 17/318* (2015.01); *H01Q 1/273* (2013.01); *H04B 1/385* (2013.01)

(58) Field of Classification Search
CPC ......... G04G 21/04; G04C 10/02; G04R 60/10
USPC ...................................................... 455/67.7
See application file for complete search history.

(56) References Cited

U.S. PATENT DOCUMENTS 8,781,420 B2    7/2014   Schlub et al.

9,070,969 B2    6/2015   Mow et al.
(Continued)

FOREIGN PATENT DOCUMENTS

| JP | H02202240 A | 8/1990 | |
| JP | 2005249737 | * 9/2005 | ............... G04G 1/00 |

(Continued)

OTHER PUBLICATIONS

Bilal Waris, Development and Testing of Split-Ring Antennas for Wearable Electro-Textile UHF RFID Tags, Tampereen Teknillinen Yliopisto Tampere University of Technology, Oct. 2016.

(Continued)

*Primary Examiner* — Lee Nguyen
(74) *Attorney, Agent, or Firm* — Treyz Law Group, P.C.; Michael H. Lyons

(57) ABSTRACT

An electronic device such as a wristwatch may include a housing with a dielectric rear wall. Wireless circuitry in the device may include an antenna formed on or over the rear wall. Matching circuitry may match the impedance of the antenna to the rest of the wireless circuitry. Processing circuitry may gather receive signal strength information and/or phase and magnitude information from radio-frequency signals received through the rear wall. The processing circuitry may track the position of the device and accumulate user statistics over time. The processing circuitry may determine whether changes in loading of the antenna through the dielectric rear housing wall have occurred based on the receive signal strength information, user statistics, and/or phase and magnitude information. If a change is detected, the processing circuitry may adjust the matching circuitry to mitigate any potential antenna detuning as a result of the change.

20 Claims, 14 Drawing Sheets

(56) References Cited

U.S. PATENT DOCUMENTS

| | | |
|---|---|---|
| 9,413,409 B2 | 8/2016 | Black et al. |
| 9,444,425 B2 | 9/2016 | Mow et al. |
| 9,537,519 B2 | 1/2017 | El-Hassan et al. |
| 2012/0026009 A1* | 2/2012 | Zhao .................. A61N 1/37229 340/870.28 |
| 2013/0076573 A1 | 3/2013 | Rappoport et al. |
| 2013/0328734 A1* | 12/2013 | Thind ...................... H03H 7/40 343/745 |
| 2016/0149290 A1 | 5/2016 | Park et al. |
| 2016/0261023 A1 | 9/2016 | Di Nallo et al. |
| 2016/0294058 A1 | 10/2016 | Tunnell et al. |
| 2016/0301138 A1 | 10/2016 | Hwang et al. |

FOREIGN PATENT DOCUMENTS

| | | | | |
|---|---|---|---|---|
| JP | 2005249737 A | * | 9/2005 | ............... G04G 1/00 |
| JP | 2005249737 A | | 9/2005 | |

OTHER PUBLICATIONS

C. M. Coleman et al., Self-Structuring Antennas, AP-S No. 1 "Adaptive, active and smart antennas" 2000 AP-S/URSI Symposium, Jul. 20, 2000.
Sabban, Wearable Antennas for Medical Applications, InTech, Chapter 13, p. 305-337.
Han et al., U.S. Appl. No. 15/255,770, filed Sep. 2, 2016.
Ehman et al., U.S. Appl. No. 15/234,907, filed Aug. 11, 2016.

\* cited by examiner

DYNAMICALLY ADJUSTABLE ANTENNAS FOR WEARABLE DEVICES

BACKGROUND

This relates to electronic devices, and more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected.

It would therefore be desirable to be able to provide improved wireless communications circuitry for wireless electronic devices.

SUMMARY

An electronic device such as a wristwatch may have a housing with metal portions such as metal sidewalls. A display may be mounted on a front face of the device. A rear face of the electronic device may be formed using a dielectric rear housing wall.

The electronic device may include wireless communications circuitry. The wireless communications circuitry may include radio-frequency transceiver circuitry and an antenna. The antenna may include an antenna ground. The antenna ground may be formed using the metal housing sidewalls and/or a conductive layer on a printed circuit board within the electronic device. The antenna may include an antenna resonating element formed from conductive traces that are patterned onto or over an interior surface of the dielectric rear housing wall. The radio-frequency transceiver circuitry may transmit and receive radio-frequency signals through the dielectric rear housing wall using the antenna. Impedance matching circuitry may be used to match the impedance of the antenna to the rest of the wireless communications circuitry.

The antenna may be subject to over-the-air loading variations through the dielectric rear housing wall. For example, the particular manner in which the user wears the electronic device, the user's physiology, the amount of moisture adjacent to the dielectric rear housing wall, and other environmental factors may affect how the antenna is loaded through the dielectric rear housing wall. Additional loading variations may be caused due to the user's hand/wrist touching the metal enclosure that forms part of antenna structure. Furthermore, the material of the wristband may also contribute to the loading variations. Processing circuitry may gather receive signal strength information and/or phase and magnitude information from the received radio-frequency signals. The processing circuitry may track the position of the electronic device over time. The processing circuitry may accumulate user statistics associated with how the user operates the electronic device over time.

The receive signal strength information gathered by the processing circuitry may include Received Signal Strength Indicator (RSSI) values as a function of time and position of the electronic device, for example. The processing circuitry may determine whether a change in loading of the antenna through the dielectric rear housing wall has occurred based on the gathered receive signal strength information, the accumulated user statistics, and/or the gathered phase and magnitude information. If the processing circuitry determines that a change in the loading of the antenna has occurred, the processing circuitry may adjust the impedance matching circuitry to compensate for the change in loading of the antenna through the dielectric rear housing wall. In this way, the processing circuitry may ensure that the antenna is impedance matched to the rest of the wireless communications circuitry in real time regardless of any variable antenna loading conditions that may occur as a result the antenna being located on the dielectric rear housing wall of the electronic device. Ensuring satisfactory impedance matching for the antenna over time may mitigate any potential antenna detuning or degradation of antenna efficiency as a result of the variable antenna loading conditions.

DETAILED DESCRIPTION

Figure 1:
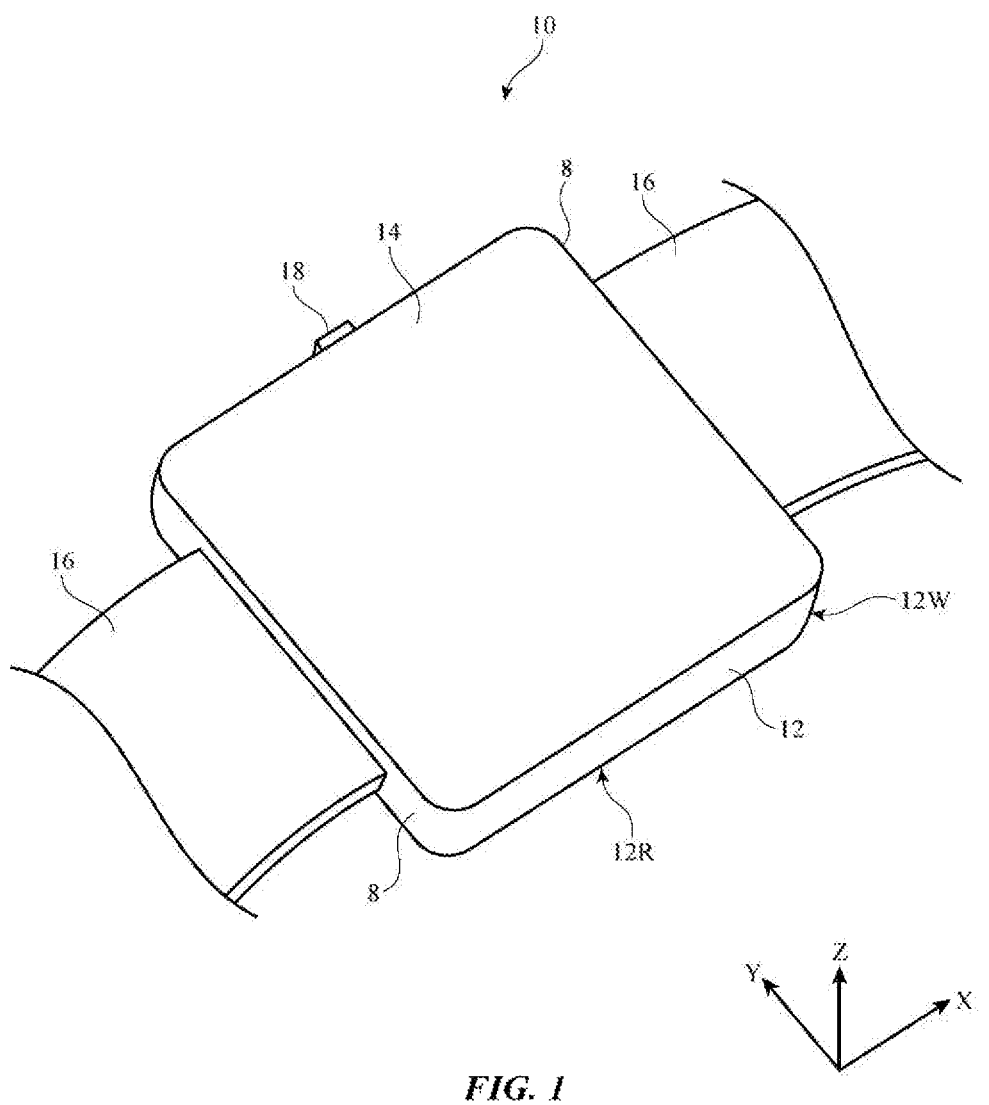
FIG. 1 is a front perspective view of an illustrative electronic device in accordance with an embodiment.

An electronic device such as electronic device 10 of FIG. 1 may be provided with wireless communications circuitry. The wireless communications circuitry may be used to support wireless communications in multiple wireless communications bands.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a wearable device such as a wristwatch. Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, gold, silver, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material.

Display 14 may be formed at the front side (face) of device 10. Housing 12 may have a rear housing wall such as rear wall 12R that opposes front face of device 10. Rear housing wall 12R may form the rear side (face) of device 10. Housing sidewalls 12W may surround the periphery of device 10 (e.g., housing sidewalls 12W may extend around peripheral edges of device 10). Rear housing wall 12R may be formed from dielectric. Examples of dielectric materials that may be used for forming rear housing wall 12R include plastic, glass, sapphire, ceramic, wood, polymer, combinations of these materials, or any other desired dielectrics. Rear housing wall 12R and/or display 14 may extend across some or all of the length (e.g., parallel to the x-axis of FIG. 1) and width (e.g., parallel to the y-axis) of device 10. Housing sidewall 12W may extend across some or all of the height of device 10 (e.g., parallel to z-axis).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., in side wall 12W or rear wall 12R) or in an opening in display 14 (as examples). Buttons may be rotary buttons, sliding buttons, buttons that are actuated by pressing on a movable button member, combinations of these, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). In the example of FIG. 1, strap 16 is connected to opposing sides 8 of device 10. Housing walls 12W on sides 8 of device 10 may include attachment structures for securing strap 16 to housing 12 (e.g., lugs or other attachment mechanisms). Strap 16 may be formed from any desired materials (e.g., metal materials, dielectric materials, or combinations of metal and dielectric materials). For example, metal materials in strap 16 may include stainless steel, aluminum, silver, gold, metal alloys, or any other desired conductive material. Dielectric materials in strap 16 may include plastic, polymer, ceramics, leather, rubber, cloth or other textiles, glass, or any other desired dielectric materials.

If desired, strap 16 may be removable. For example, a user may replace strap 16 with a different strap having similar or different materials. If desired, strap 16 may be adjustable. For example, strap 16 may include a clasp, buckle, or other adjustable structures that allow a user to adjust the length of strap 16 and/or to adjust how tight strap 16 is on the user's wrist while the user is wearing device 10. Configurations that do not include straps may also be used for device 10.

Figure 2:
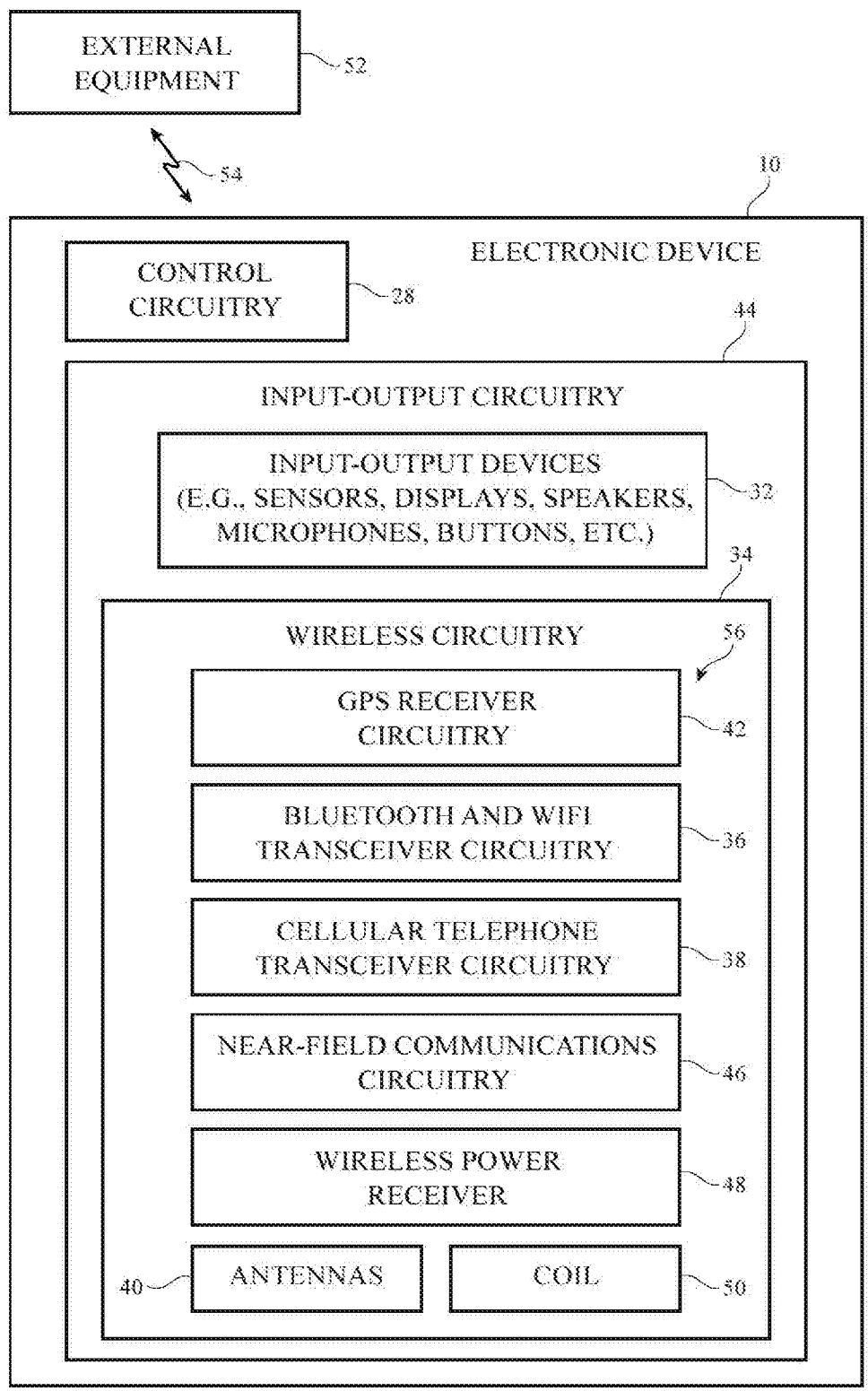
FIG. 2 is a schematic diagram of an illustrative electronic device in accordance with an embodiment.

A schematic diagram showing illustrative components that may be used in device 10 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, scrolling wheels, touch pads, key pads, keyboards, microphones, cameras, buttons, speakers, status indicators, light sources, audio jacks and other audio port components, digital data port devices, light sensors, light-emitting diodes, motion sensors (accelerometers), capacitance sensors, proximity sensors, magnetic sensors, force sensors (e.g., force sensors coupled to a display to detect pressure applied to the display), etc.

As shown in FIG. 2, electronic device 10 may communicate wirelessly with external equipment 52 over wireless links such as wireless link 54. External equipment 52 may include cellular telephone network base stations, wireless local area network equipment (e.g., wireless routers and/or wireless access points), peer devices, other portable electronic devices such as a cellular telephone or wireless headset, and other external equipment. Link 54 may be a cellular telephone link, a wireless local area network link, or a communications link supported using other types of wireless communications.

Input-output circuitry 44 may include wireless circuitry 34. Wireless circuitry 34 may include coil 50 and wireless power receiver 48 for receiving wirelessly transmitted power from a wireless power adapter. To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

Wireless circuitry 34 may include radio-frequency transceiver circuitry 56 for handling various radio-frequency communications bands. For example, circuitry 34 may include transceiver circuitry 36, 38, 42, and 46. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1400 MHz or 1500 MHz to 2170 MHz (e.g., a midband with a peak at 1700 MHz), and a high band from 2170 or 2300 to 2700 MHz (e.g., a high band with a peak at 2400 MHz) or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) transceiver circuitry 46 (e.g., an NFC transceiver operating at 13.56 MHz or other suitable frequency), etc. Wireless circuitry 34 may include satellite navigation system circuitry such as global positioning system (GPS) receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, monopole antenna structures, dipole antenna structures, hybrids of these designs, etc. Different types of antennas may be used for different bands or combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, and/or cellular telephone communications bands such as one or more cellular telephone bands at 700-960 MHz, 1400-2170 MHz, and 2170-2700 MHz.

However, in practice, the general size required for the antenna increases as the desired frequency for operation decreases (i.e., as the corresponding wavelength increases). In addition, space is at a premium in compact electronic devices such as device 10 (e.g., especially as the demand for smaller and more aesthetically pleasing device form factors increases). If care is not taken, it can be difficult to be able to provide compact electronic devices with satisfactory antenna coverage in all communications bands of interest, particularly for relatively low frequencies (i.e., relatively long wavelengths) such as low band cellular telephone frequencies at 700-960 MHz.

Figure 3:
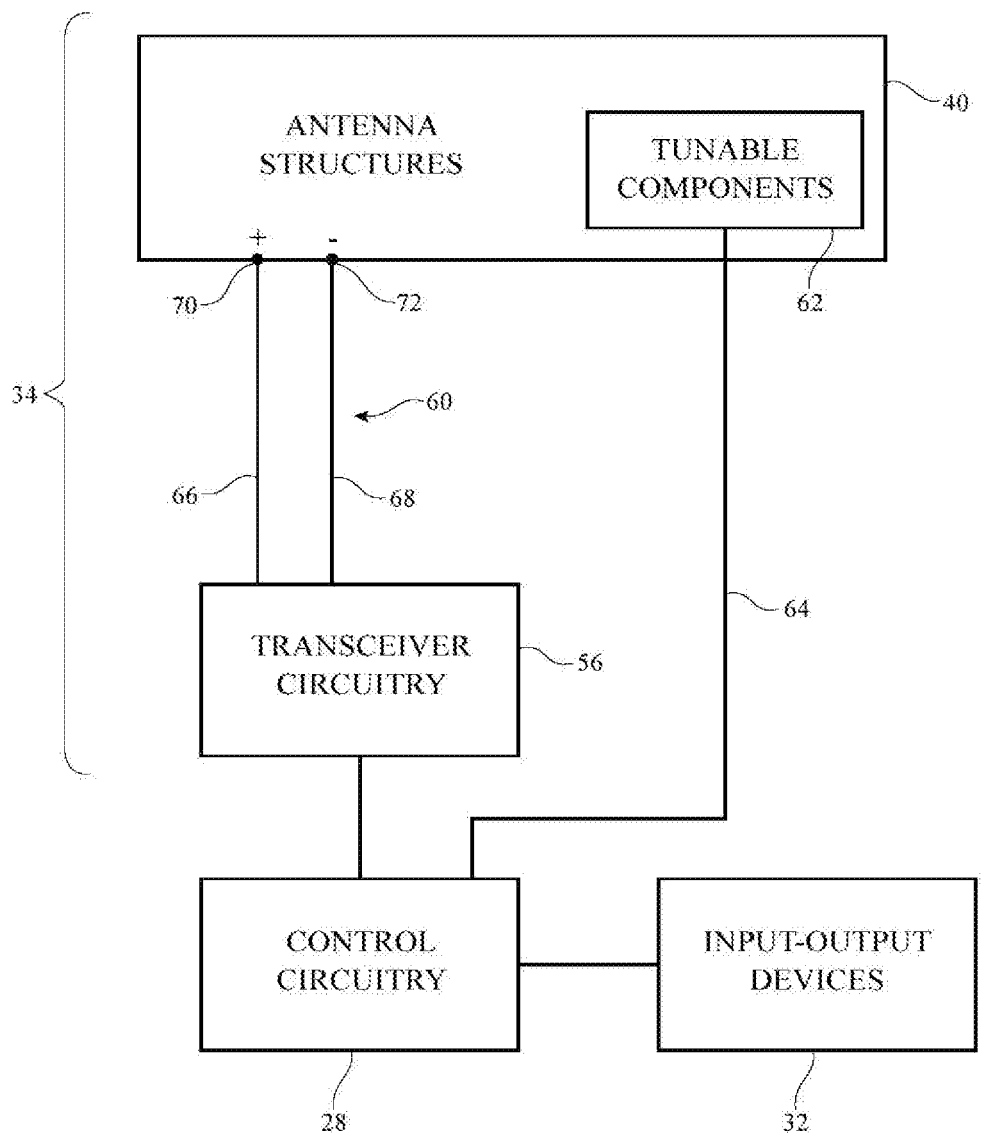
FIG. 3 is a diagram of illustrative wireless circuitry in an electronic device in accordance with an embodiment.

FIG. 3 is a diagram showing how transceiver circuitry 56 in wireless circuitry 34 may be coupled to antenna structures 40 using paths such as path 60. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna structures 40 may be provided with adjustable circuits such as tunable components 62 to tune antennas over communications bands of interest. Tunable components 62 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures.

During operation of device 10, control circuitry 28 may issue control signals on one or more paths such as path 64 that adjust inductance values, capacitance values, or other parameters associated with tunable components 62, thereby tuning antenna structures 40 to cover desired communications bands.

Path 60 may include one or more radio-frequency transmission lines. As an example, signal path 60 of FIG. 3 may be a transmission line having first and second conductive paths such as paths 66 and 68, respectively. Path 66 may be a positive signal line and path 68 may be a ground signal line. Lines 66 and 68 may form parts of a coaxial cable, a stripline transmission line, and/or a microstrip transmission line (as examples). A matching network formed from components such as inductors, resistors, and capacitors may be used in matching the impedance of antenna structures 40 to the impedance of transmission line 60. Matching network components may be provided as discrete components (e.g., surface mount technology components) or may be formed from housing structures, printed circuit board structures, traces on plastic supports, etc. Matching network components may, for example, be interposed on line 60. The matching network components may be adjusted using control signals received from control circuitry 28 if desired. Components such as these may also be used in forming filter circuitry in antenna structures 40.

Transmission line 60 may be directly coupled to an antenna resonating element and ground for antenna 40 or may be coupled to near-field-coupled antenna feed structures that are used in indirectly feeding a resonating element for antenna 40. As an example, antenna structures 40 may form an inverted-F antenna, a loop antenna, a patch antenna, a slot antenna, or other antenna having an antenna feed with a positive antenna feed terminal such as terminal 70 and a ground antenna feed terminal such as ground antenna feed terminal 72. Positive transmission line conductor 66 may be coupled to positive antenna feed terminal 70 and ground transmission line conductor 68 may be coupled to ground antenna feed terminal 72. If desired, antenna 40 may include an antenna resonating element that is indirectly fed using near-field coupling. In a near-field coupling arrangement, transmission line 60 is coupled to a near-field-coupled antenna feed structure that is used to indirectly feed antenna structures such as the antenna resonating element. This example is merely illustrative and, in general, any desired antenna feeding arrangement may be used.

Figure 4:
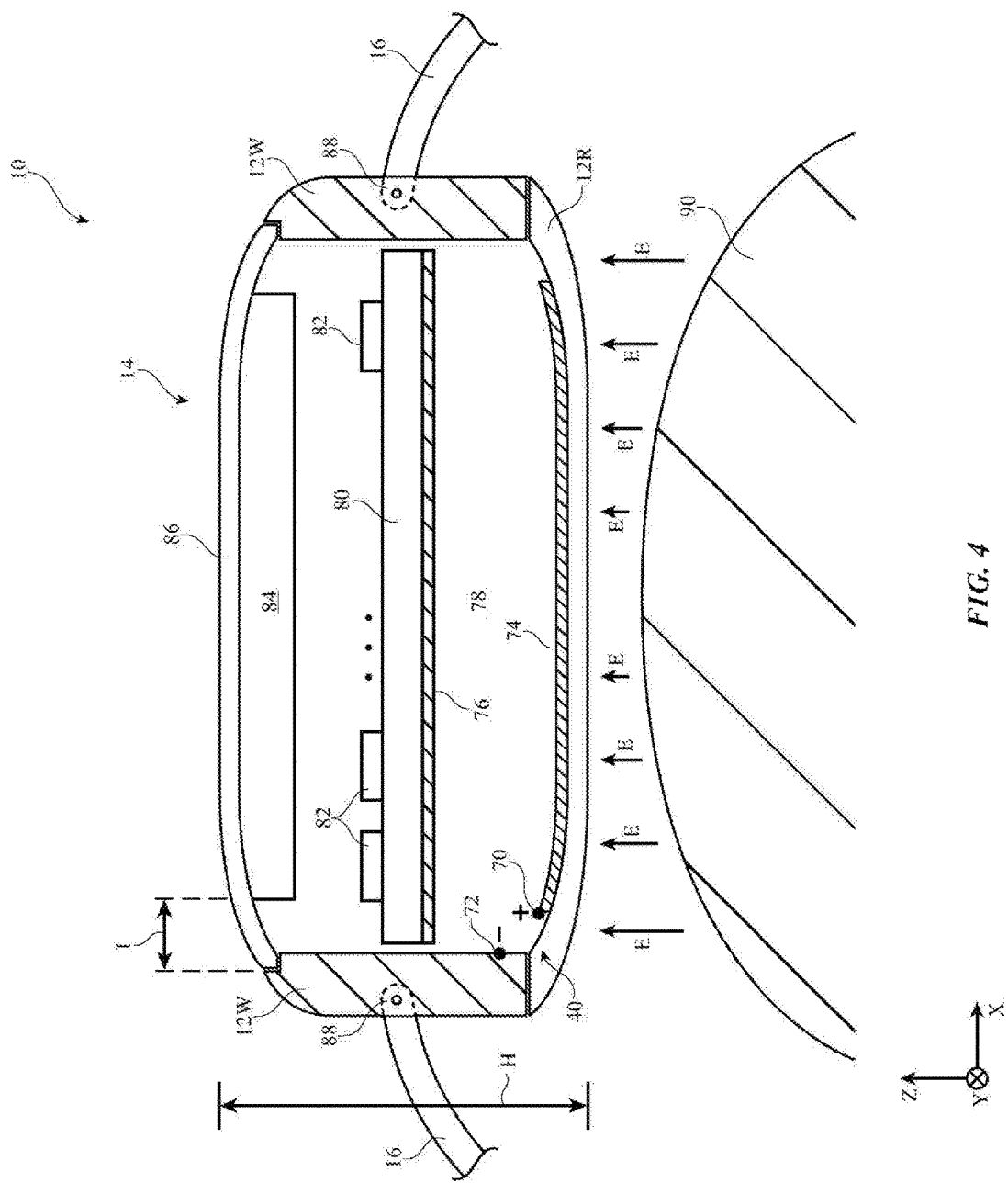
FIG. 4 is a cross-sectional side view of an illustrative electronic device having an antenna that conveys wireless signals through a rear side of the electronic device in accordance with an embodiment.

FIG. 4 is a cross-sectional side view of illustrative device 10 showing how antenna 40 may be formed within device 10. The plane of the page of FIG. 4 may be, for example, the X-Z plane of FIG. 1.

As shown in FIG. 4, device 10 may have conductive housing sidewalls 12W that extend from the rear face to the front face of device 10. Display 14 may form the front face of device 10 whereas dielectric rear housing wall 12R forms the rear face of device 10. Metal housing sidewalls 12W may be used in forming a portion of an antenna ground for antenna 40 if desired.

Display 14 may include a display cover layer 86 and a display module 84. Display module 84 may include active display components such as touch sensors, pixels, or other light-emitting components that emit light through display cover layer 86. Display cover layer 86 may extend across some or substantially all of the length and width of device 10. Display cover layer 86 may include a transparent portion that passes the light emitted by display module 172 (e.g., so that the light may be seen by a user). If desired, an opaque masking layer such as an ink layer may be formed along the portion of display cover layer 86 that extends beyond display module 84 to hide the internal components of device 10 from view.

Strap 16 may be secured to housing sidewalls 12W using corresponding attachment structures 88. Attachment structures 88 may include lugs, spring structures, or any other desired attachment mechanisms. Strap 16 may be formed using any desired materials (e.g., metal materials, dielectric materials, or combinations of metal and dielectric materials). If desired, strap 16 may be removed from attachment structures 88 (e.g., so that a user of device 10 can swap in different straps having similar or different materials).

Device 10 may include printed circuit board structures such as printed circuit board 80. Printed circuit board 80 may be a rigid printed circuit board, a flexible printed circuit board, or may include both flexible and rigid printed circuit board structures. Printed circuit board 80 may sometimes be referred to herein as main logic board 80. Electrical components 82 may be mounted to main logic board 80. Electrical components 82 may include, for example, transceiver circuitry 56, one or more input-output devices 32, some or all of control circuitry 28 (FIG. 2), portions of housing 12, or any other desired components. Main logic board 80 may include one or more conductive layers such as conductive layer 76. Conductive layer 76 may, for example, form a portion of the antenna ground for antenna 40. Conductive layer 76 may therefore sometimes be referred to herein as grounded layer 76, ground layer 76, ground conductor 76, or grounded conductor 76.

Conductive layer 76 may, if desired, be shorted (grounded) to metal housing sidewalls 12W (e.g., the antenna ground for antenna 40 may include conductive layer 76 and metal housing sidewalls 12W). Conductive layer 76 may be formed using metal foil, stamped sheet metal, conductive traces patterned onto a surface of main logic board 80, a conductive trace on a flexible printed circuit mounted to main logic board 80, metal housing portions, or from any other desired conductive structures. If desired, conductive layer 76 may be formed (embedded) within main logic board 80 (e.g., conductive layer 76 may be stacked between dielectric layers of logic board 80). In another suitable arrangement, conductive layer 76 may be omitted.

As shown in FIG. 4, rear housing wall 12R may extend across substantially all of the length and width of device 10. Rear housing wall 12R may be formed from any desired dielectric material. For example, rear housing wall 12R may be formed from plastic, glass, sapphire, ceramic, wood, polymer, combinations of these materials, or any other desired dielectrics. Rear housing wall 12R may be optically opaque or optically transparent or may include both optically opaque and optically transparent portions.

Antenna 40 may include antenna structures 74. Antenna structures 74 may, for example, be some or all of an antenna resonating element for antenna 40 (e.g., an inverted-F antenna resonating element arm, a planar inverted-F antenna resonating element, a patch antenna resonating element, a dipole antenna resonating element, a monopole antenna resonating element, etc.). In one suitable arrangement, antenna resonating element 74 may be formed from conductive traces that are patterned directly onto the interior surface of dielectric housing wall 12R (e.g., the patterned conductive traces may be in direct contact with the inner surface of dielectric housing wall 12R). If desired, antenna resonating element 74 may be formed using conductive foil or other conductive structures that are placed in direct contact with rear housing wall 12R. In another suitable arrangement, antenna resonating element 74 may be formed from conductive traces on a flexible printed circuit substrate or other dielectric substrate that is located over (e.g., vertically separated from and overlapping) or in direct contact with rear housing wall 12R. Antenna resonating element traces 74 may be formed using any desired conductive material (e.g., aluminum, copper, metal alloys, stainless steel, gold, etc.).

The example of FIG. 4 in which rear housing wall 12R is formed using dielectric materials is merely illustrative. If desired, the rear housing wall of device 10 may include a combination of conductive and dielectric materials. For example, a portion of the rear housing wall may be formed from metal whereas another portion of the rear housing wall is formed from dielectric (e.g., the portion of the rear housing wall formed from dielectric may extend across some but not all of the length and width of device 10). The dielectric portion of the rear housing wall may, for example, include a dielectric window within a conductive portion of the rear housing wall (e.g., the rear housing wall may include a metal frame for the dielectric portion of the rear housing wall or other structures that surround the dielectric portion of the rear housing wall). The rear housing wall may include multiple dielectric windows if desired.

Positive antenna feed terminal 70 of antenna 40 may be coupled to a portion of antenna resonating element traces 74 to feed radio-frequency antenna signals for antenna 40. Ground antenna feed terminal 72 may be coupled to the antenna ground for antenna 40. In the example of FIG. 4, ground antenna feed terminal 72 is coupled to metal housing sidewall 12W. If desired, ground antenna feed terminal 72 may be coupled to conductive layer 76 or any other grounded structures. If desired, one or more additional portions of antenna resonating element traces 74 may be shorted to the antenna ground (e.g., housing wall 12W, conductive layer 76, and/or other grounded structures) using other conductive paths (not shown). Such conductive paths may, for example, form a return (short) path for antenna 40 (e.g., in scenarios where antenna 40 is an inverted-F antenna or planar inverted-F antenna).

In scenarios where antenna resonating element traces 74 are patterned directly onto rear housing wall 12R, rear housing wall 12R may serve as a mechanical support structure or carrier structure for antenna resonating element 74. Antenna resonating element traces 74 may conform to the shape of the interior surface of dielectric rear housing wall 12R. In the example of FIG. 4, the interior surface of dielectric rear housing wall 12R has a slightly curved shape (e.g., to increase the total volume for components within device 10 relative to scenarios where the interior surface of wall 12R is flat). Antenna resonating element traces 74 may therefore be formed within a curved surface that is in direct contact with rear housing wall 12R. In another suitable arrangement, antenna resonating element traces 74 may be formed on a flexible printed circuit or other substrate that is placed in contact with or layered over rear housing wall 12R.

Antenna 40 may receive and/or transmit radio-frequency signals through rear housing wall 12R. Radio-frequency signals transmitted by antenna 40 may be shielded from electrical components 82 by conductive layer 76 and main logic board 80, for example. Similarly, conductive layer 76 and main logic board 80 may shield antenna 40 from components 82, thereby mitigating electromagnetic interference between antenna 40 and components 82.

If desired, other components (e.g., one or more sensors 32 such as a light sensor, proximity sensor, touch sensor, etc.) may be mounted to rear housing wall 12R. For example, antenna resonating element traces 74 may surround or be formed around the periphery of other components that are mounted to rear housing wall 12R. In one suitable arrangement, coil 50 (FIG. 2) is placed in contact with rear housing wall 12R for receiving wireless power (e.g., wireless charging signals) through dielectric rear housing wall 12R. In this scenario, antenna resonating element traces 74 may surround coil 50 at the interior surface of rear housing wall 12R.

By forming antenna 40 adjacent to rear housing wall 12R, the vertical height H of device 10 may be shorter than would otherwise be possible in scenarios where the antenna resonating element is located elsewhere on device 10 (while still allowing antenna 40 to exhibit satisfactory antenna efficiency). As an example, vertical height H may be less than or equal to 11.4 mm, less than 15 mm, between 8 and 11.4 mm, or any other desired height while still allowing antenna 40 to operate with satisfactory antenna efficiency. Forming antenna 40 along the rear side of device 10 may also allow for reduction of the size of the inactive region of display 14 (as shown by arrow I), because antenna 40 can transmit radio-frequency signals through the rear side of device 10 without concern that the signals will be blocked by display module 84.

Forming antenna 40 along rear housing wall 12R may also allow the perimeter of antenna resonating element 74 to be sufficiently large so as to allow for coverage of relatively low frequencies such as frequencies in a cellular telephone band between 700 and 960 MHz. In general, antenna 40 may handle radio-frequency signals above 700 MHz, such as signals at 2.4 GHz and/or 5 GHz for IEEE 802.11 communications, Bluetooth®, and/or other wireless local area network communications may be handled by peripheral antenna 40P (as an example), low band cellular telephone signals (e.g., cellular telephone communications at frequencies between 700 MHz and 960 MHz), cellular telephone signals and GPS signals in a mid-band, a high band, and other bands that are above 960 MHz such as cellular telephone and GPS signals at 960-2700 MHz, radio-frequency signals at 2.4 GHz and/or 5 GHz for IEEE 802.11 communications, Bluetooth®, and/or other wireless local area network communications, and any other desired bands. By covering all of these bands using a single antenna 40, the space that would have otherwise been occupied by additional antennas within device 10 may be used for other electronic device components or to further reduce the size (e.g., dimension H and/or I of FIG. 4) of device 10 without sacrificing antenna efficiency.

In practice, the performance of antenna 40 may be optimized by the presence of an external object adjacent to rear housing wall 12R. For example, the presence of a user's wrist 90 adjacent to rear housing wall 12R when the user is wearing device 10 may enhance the performance of antenna 40. During operation, antenna resonating element 74 may transmit and/or receive radio-frequency signals having electric fields (E) that are oriented normal to the surfaces of rear face 12R and wrist 90. These signals may sometimes be referred to as surface waves, which are then propagated along the surface of wrist 90 and outwards (e.g., antenna resonating element traces 74 and wrist 90 may serve as a waveguide that directs the surface waves outwards).

Figure 5:
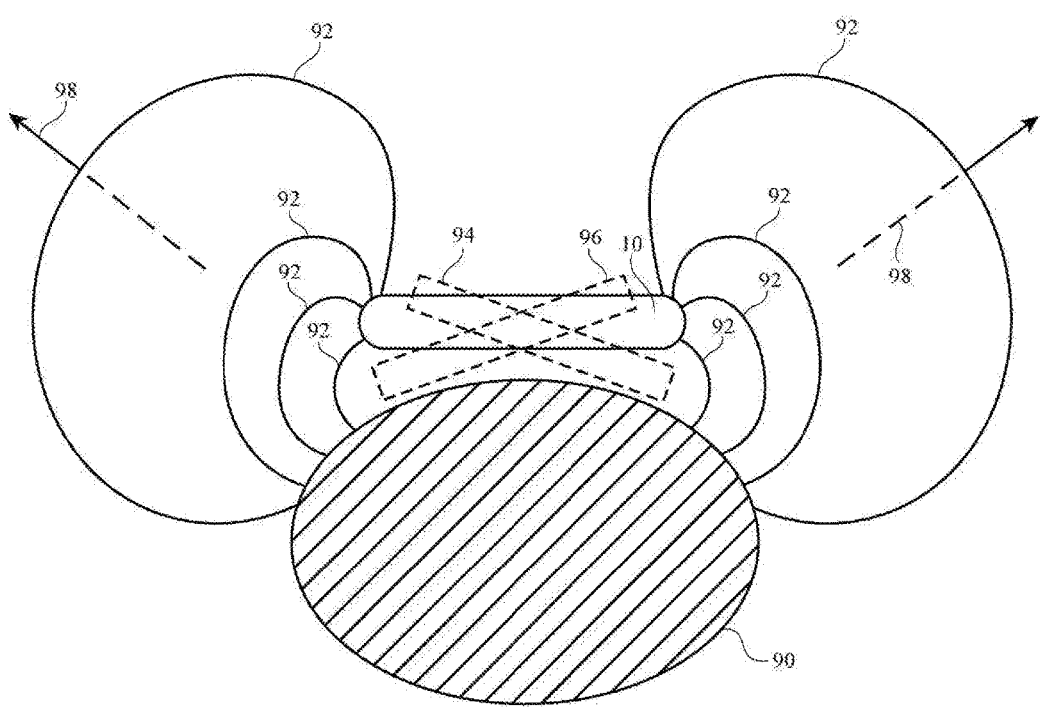
FIG. 5 is a cross-sectional side view of an illustrative electronic device showing how an antenna at the rear of the device and a user's wrist may guide electromagnetic energy away from the device in accordance with an embodiment.

FIG. 5 is a cross-sectional side view showing how the electromagnetic signals transmitted by antenna 40 may be propagated outwards due to the presence of the user's wrist. As shown in FIG. 5, contour lines 92 indicate contours of constant electric field magnitude. The magnitude of the electric field generated by antenna 40 is highest in the space between device 10 and wrist 90. The signals may propagate along resonating element trace 74 and the surface of wrist 90 in an outward direction away from device 10, as shown by paths 98. This may allow the signals to be properly received by external communications equipment (e.g., equipment 52 of FIG. 2) even though antenna 40 is located close to wrist 90 and typically pointed away from the external communications equipment. In practice, the presence of wrist 90 may serve to enhance the propagation of the electromagnetic waves relative to situations when wrist 90 is not present. For example, the radio-frequency signals emitted by antenna 40 may not be properly directed in the absence of wrist 90, resulting in poor or unsatisfactory wireless link quality with the external equipment. However, in the presence of wrist 90, the signals may be properly directed as shown by arrows 98, thereby allowing for a satisfactory link quality to be obtained. The example of FIG. 5 is merely illustrative. In general, the electric field patterns may have any desired shape or configuration.

When performing wireless communications operations, antenna 40 may be loaded through rear housing wall 12R by external objects in the vicinity of rear housing wall 12R. If care is not taken, antenna 40 may exhibit an altered frequency response relative to a free space environment when an external object such wrist 90 is brought into the vicinity of antenna 40 (e.g., antenna 40 may be detuned because the impedance of the antenna has been changed due to loading from object 90 through rear wall 12R). In addition, different types of objects or materials may load antenna 40 by differing amounts. Similarly, adjustments to the orientation or distance of the external object with respect to rear housing wall 12R may load antenna 40 by different amounts. During normal operation of device 10 by an end user, these loading variations may occur when the user adjusts the location or orientation of device 10 on their wrist, when the user adjusts the distance between their wrist and antenna 40 (e.g., by tightening or loosening strap 16), when the user swaps out strap 16 for a different strap, when a different user wears device 10 (e.g., because different users may have different wrist physiologies that affect the loading of antenna 40 differently), when strap 16 or wrist 90 becomes wet (e.g., with sweat or water such as when the user is swimming while wearing device 10), or when a part of the user's clothing such as a shirt sleeve is placed between or removed from between device 10 and wrist 90, as examples. These examples are merely illustrative. In general, any environmental factors may load antenna 40 by different amounts through housing wall 12R.

Such environmental loading variations may alter the impedance of antenna 40 relative to transmission line 60. If care is not taken, these variations may generate an impedance discontinuity between antenna 40 and the rest of wireless communications circuitry 34. The impedance discontinuity may cause some radio-frequency energy to be reflected at the boundary between antenna 40 and the rest of wireless communications circuitry 34 instead of being used to convey signals with external equipment 52 (FIG. 2). If these environmental loading variations are not compensated for, antenna 40 may become detuned as the environmental loading variations change over time, thereby reducing the overall antenna efficiency and communications link quality during normal operation of device 10.

In order to compensate for these antenna impedance changes, storage and processing circuitry 28 may control adjustable matching circuitry coupled to antenna 40 to ensure that antenna 40 is suitably matched to the rest of wireless circuitry 34 regardless of how antenna 40 is loaded through wall 12R. If desired, storage and processing circuitry 28 may adjust tunable components 62 (FIG. 3) in addition to adjustable matching circuitry to cover the desired frequency bands of interest and to compensate for any detuning of antenna 40 due to loading of the antenna by external objects.

Storage and processing circuitry 28 may use any desired information for determining when and how to adjust the adjustable matching circuitry to compensate for variations in antenna loading. For example, control circuitry 28 may adjust the matching circuitry based on instructions received from external equipment such as a wireless base station or access point. If desired, control circuitry 28 may adjust the matching circuitry based on the current operating state of device 10. For example, control circuitry 28 may identify a usage scenario (e.g., whether device 10 is being used to browse the internet, conduct a phone call, send an email, access GPS, etc.) to determine how to adjust the matching circuitry. As another example, control circuitry 28 may identify sensor data that is used to identify how to adjust the matching circuitry (e.g., optical sensor data, proximity sensor data, touch sensor data, data indicative of how close a user's body is to rear housing wall 12R, etc.). As yet another example, control circuitry 28 may gather antenna performance information (e.g., performance metric data gathered using antenna 40 that can be used to characterize the performance of antenna 40) that can be used to identify how to adjust the matching circuitry. If desired, information on the habits of the user of device 10 (sometimes referred to herein as user statistics) may also be processed for determining how to adjust the matching circuitry. In general, control circuitry 28 may process any desired combination of this information or other information to identify when to adjust the matching circuitry (e.g., when antenna loading variations occur) and to identify how to adjust the matching circuitry (e.g., in such a way so as to mitigate the potential detuning defects of the antenna loading variations).

Figure 6:
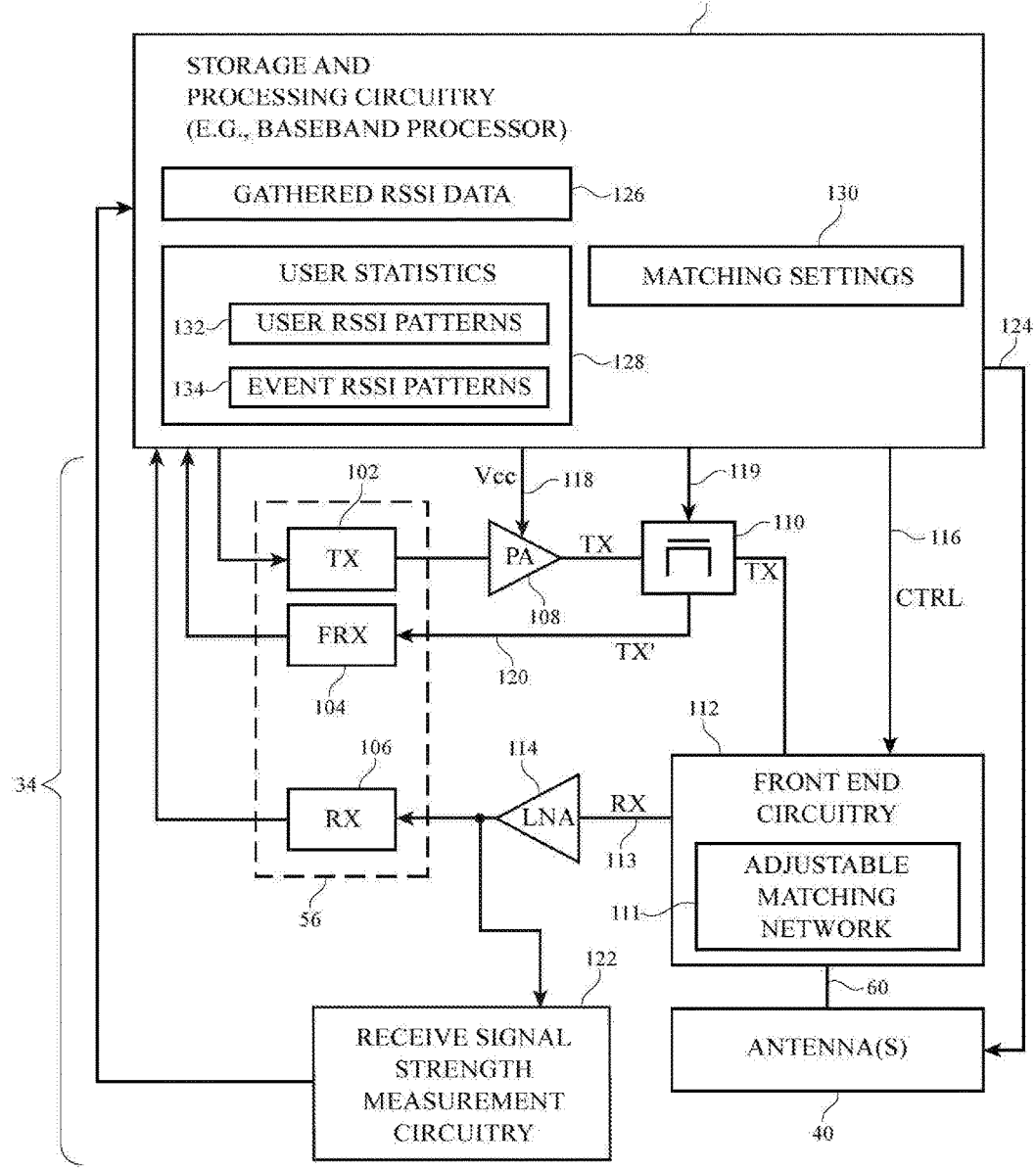
FIG. 6 is a diagram of illustrative circuitry that may be used in gathering antenna performance information and adjusting an impedance matching circuit for an antenna in accordance with an embodiment.

Illustrative circuitry for gathering and processing antenna performance information to determine how to adjust antenna 40 to compensate for antenna loading variations is shown in FIG. 6. As shown in FIG. 6, wireless communications circuitry 34 may include one or more antennas 40, front end circuitry 112, radio-frequency coupler circuitry 110, power amplifier circuitry 108, low noise amplifier circuitry 114, transceiver circuitry 56, and receive signal strength measurement circuitry 122.

Storage and processing circuitry 28 may include baseband processor circuitry, storage such as non-volatile or volatile memory, and control circuitry for controlling wireless communications circuitry 34 to transmit and/or receive radio-frequency signals. Digital data signals that are to be transmitted by device 10 may be generated by one or more baseband processors in circuitry 28. Circuitry 28 may modulate the digital data signals in accordance with a desired communications protocol (e.g., a desired cellular telephone standard and modulation scheme, a wireless local area network protocol, etc.) and may provide corresponding output signals for transmission to transceiver circuitry 56 (e.g., to one or more transmitters 102 in transceiver circuitry 56). Transceiver circuitry 56 may include mixer circuitry that up-converts the output signals to a radio-frequency and that transmits the radio-frequency signals to radio-frequency power amplifier (PA) circuitry 108. If desired, transceiver circuitry 56 may include digital-to-analog converter circuitry that converts the output signals to corresponding analog signals.

Control circuitry in storage and processing circuitry 28 may adjust the level of voltage Vcc (e.g., sometimes referred to herein as power supply voltage Vcc or power amplifier bias voltage Vcc) provided to power amplifier circuitry 108 over control path 118. Bias voltage Vcc may be used as a power supply voltage for one or more active power amplifier stages in power amplifier circuitry 108. During data transmission, power amplifier circuitry 108 may amplify the output power of transmitted signals TX to a sufficiently high level to ensure adequate signal transmission.

The output of power amplifier circuitry 108 may be coupled to radio-frequency front end circuitry 112 through radio-frequency coupler 110. Front end circuitry 112 may include adjustable impedance matching circuitry such as adjustable matching network 111. Adjustable impedance matching circuitry 111 may include networks of passive and/or active (adjustable) components such as resistors, inductors, and capacitors that are adjusted to ensure that antenna 40 is impedance matched to the rest of circuitry 34. Storage and processing circuitry 28 may provide control signals CTRL to adjustable matching circuitry 111 in front end 112 over control path 116.

In some scenarios, processing circuitry 28 controls matching circuitry 111 to exhibit a particular predetermined impedance that is selected based only on the frequency of the signals that are to be conveyed over antenna 40. For example, processing circuitry 28 may store factory-calibrated data for matching circuitry 111 that identifies a particular setting for matching circuitry 111 corresponding to each possible frequency of operation. When processing circuitry 28 determines the frequency to be used for wireless communications, matching circuitry 111 is placed into the corresponding setting identified by the factory-calibrated data. However, performing such a priori adjustments based solely on the frequency to be used does not account for any potential antenna loading variations through rear housing wall 12R that occur during normal operation. Processing circuitry 28 may therefore perform dynamic adjustment of matching circuitry 111 based on how antenna 40 is being loaded through rear housing wall 12R in real time (e.g., so that circuitry 28 alters the impedance of antenna 40 to match the impedance of the rest of wireless circuitry 34 in real time regardless of the loading conditions of antenna 40).

As an example, when an external object such as wrist 90 (FIG. 5) is brought into proximity of antenna 40, antenna 40 may be loaded such that the impedance of antenna 40 is no longer matched to the rest of circuitry 34. Storage and processing circuitry 28 may control the impedance of adjustable impedance matching network 111 to match the antenna 40 loaded by wrist 90. When matching network 111 is matched to antenna 40, the potential detuning as a result of the change in antenna loading may be mitigated and antenna efficiency may be maximized. As another example, antenna 40 may be loaded by a first amount when device 10 is oriented at position 94 with respect to the user's wrist 90 (FIG. 5) and may be loaded by a second amount when device 10 is oriented at position 96. Control circuitry 28 may place matching circuitry 111 in a first setting that mitigates the first amount of antenna loading when device 10 is at position 94 and may place circuitry 111 in a second setting that mitigates the second amount of antenna loading when device 10 is at position 96. Storage and processing circuitry 28 may additionally or alternatively provide control signals to antenna 40 over path 124 to compensate for different antenna loading conditions, if desired (e.g., to adjust tunable components 62 of FIG. 2).

If desired, front circuitry 112 may include other circuitry such as radio-frequency switching circuitry (e.g., multiplexing circuits), filtering circuitry (e.g., duplexers and diplexers), or any other desired radio-frequency front end circuitry. If desired, filtering circuitry in front end 112 may be used to route input (receive) and output (transmit) signals based on their frequency. For example, filtering circuitry in front end 112 may transmit (uplink) signals TX received from coupler 110 to antenna 40 and may route receive (downlink) signals RX that have been received by antenna 40 onto receive path 113. If desired, low noise amplifier (LNA) circuitry 114 may be interposed on receive path 113. Low noise amplifier circuitry 114 may amplify receive signals RX on path 113. The amplified receive signals RX may be routed to transceiver circuitry 56 (e.g., to one or more receiver circuits 106 in transceiver circuitry 56). Transceiver circuitry 56 may provide signals received over path 113 to baseband circuitry in storage and processing circuitry 18 (e.g., after down-converting the signals to a baseband frequency using mixer circuitry).

Coupler 110 may be used to tap antenna signals flowing to and from antenna 40. Tapped antenna signals from coupler 110 may be processed using a receiver in transceiver circuitry 56 or a separate receiver. As shown in FIG. 6, coupler 110 may provide tapped antenna signals TX' to feedback receiver 104 over feedback path 120. Storage and processing circuitry 28 may use control path 119 to control coupler 110. For example, storage and processing circuitry 28 may direct coupler 110 to provide receiver 104 with a tapped version of the signals TX being transmitted by power amplifier 108 (sometimes referred to as forward signals) or to provide receiver 104 with a corresponding tapped version of the transmitted signals TX that have been reflected from antenna 40 (sometimes referred to as reverse signals).

The tapped signals may be down-converted and provided to storage and processing circuitry 28. Storage and processing circuitry 28 may process the tapped signals to generate antenna performance metric information such as phase and magnitude measurements of the impedance of antenna 40. For example, by processing the forward and reverse signals for antenna 40, storage and processing circuitry 28 may gather information on the phase and magnitude of the impedance of antenna 40 in real time. The phase and magnitude measurements may include complex impedance data such as scattering parameter (so-called "S-parameter") values that are indicative of the complex impedance of antenna 40. Measurements of the S-parameters may include, for example, measured reflection coefficient parameter values (so-called S11 values) that are indicative of the amount of radio-frequency signals that is reflected back towards coupler 110 from antenna 40 during signal transmission.

The phase and magnitude of the impedance of antenna 40 may be used to determine whether the operation of antenna 40 has been affected by the operating environment of device 10 (e.g., whether the presence of an external object has detuned or changed the loading of antenna 40). For example, storage and processing circuitry 28 may detect variations in the gathered phase and magnitude information (e.g., excessively high magnitude S11 measurements, etc.) to identify when antenna 40 has been detuned/loaded by the presence of an external object. If storage and processing circuitry 28 detects that antenna 40 has been detuned due to the loading of antenna 40 (e.g., due to the user adjusting strap 16, changing strap 16, adjusting an orientation of device 10 relative to wrist 90, strap 16 becoming wet, a different user wearing device 10, etc.), circuitry 28 may issue control signals CTRL over path 116 to adjust impedance matching network 111 to compensate for the detuning. After impedance matching network 111 has been adjusted, antenna 40 is impedance matched with the rest of wireless communications circuitry 34 and the antenna efficiency is maximized.

If desired, other performance metric information such as receive signal strength information may be used to determine how to adjust circuitry 111 in response to variations in antenna loading. Receive signal strength measurement circuitry 122 in wireless communications circuitry 34 may receive signals RX from low noise amplifier circuitry 114. Measurement circuitry 122 may gather information indicative of the receive signal strength of signals RX. For example, measurement circuitry 122 may gather Received Signal Strength Indicator (RSSI) values from receive signals RX. In one suitable arrangement, circuitry 122 may include diode detector circuitry that converts the received radio-frequency signal to a known voltage level for extracting the RSSI values. The RSSI values may be transmitted to storage and processing circuitry 28. RSSI values gathered by measurement circuitry 122 may be accumulated and stored on circuitry 28 as gathered RSSI data 126. Gathered RSSI data 126 may be stored on circuitry 28 in a data structure such as a database file, as one example.

Storage and processing circuitry 28 may track the physical location of device 10 over time. For example, GPS receiver circuitry 42 (FIG. 2) may receive satellite navigation signals for identifying the location of device 10 over time. As another example, short range transceiver 36 may be used to determine the location of device 10 relative to a wireless base station having a known position. The position of device 10 relative to the wireless base station may be compared to the known position of the wireless base station to identify the spatial location of device 10. In general, any desired methods may be used for identifying the location of device 10. The location of device 10 may be identified using spatial coordinates such as latitude, longitude, and/or elevation coordinates, or any other desired spatial coordinates.

When accumulating and storing RSSI data 126, storage and processing circuitry 28 may also identify the time at which each RSSI measurement was made (sometimes referred to herein as an acquisition time or RSSI acquisition time) and/or the geographical location of device 10 at the time each RSSI measurement was made (sometimes referred to herein as an acquisition position or wearable electronic device acquisition position). For example, gathered RSSI data 126 may include entries (e.g., rows in a data structure or database) that each identify a particular RSSI value measured by circuitry 122, a corresponding acquisition time at which that RSSI value was measured, and/or a corresponding wearable electronic device acquisition position identifying the location of device 10 when that RSSI value was measured. In this way, gathered RSSI data 126 may be stored as a function of time and space (i.e., device position) on storage and processing circuitry 28.

If desired, storage and processing circuitry 28 may accumulate and store information about the habits of one or more users of device 10 as user statistics 128. User statistics 128 may be maintained in one or more data structures stored in memory on circuitry 28 (e.g., the same data structure as RSSI data 126 or a different data structure). User statistics 128 may include location data (e.g., information identifying where device 10 is typically located at different times of day), information about how the user typically wears device 10, information about the typical configuration of strap 16 when device 10 is worn by the user, information about the typical performance of antenna 40 or other components in wireless circuitry (e.g., performance metric data), or any other information about the routine or habits of the user of device 10.

If desired, user statistics 128 may include information identifying predetermined patterns of RSSI data as a function of time and/or space. For example, user RSSI patterns 132 may be stored on circuitry 28. User RSSI patterns 132 may be predetermined patterns of RSSI values as a function of time and/or space that are associated with typical operation of device 10 by a user. For example, as the user goes about their day (e.g., wakes up, drives to work, drives home from work, goes to sleep, etc.), the gathered RSSI values may exhibit predetermined patterns associated with the performance of antenna 40 as the user goes about their day. User RSSI patterns 132 may, for example, serve as a background or baseline measurement that is used by circuitry 28 to determine when unusual events requiring antenna matching adjustment have occurred. RSSI patterns 132 may, if desired, be loaded onto device 10 during manufacture of device 10 (e.g., using factory-calibrated patterns or settings). If desired, storage and processing circuitry 28 may continually update (train) user RSSI patterns 132 based on real time RSSI measurements performed by circuitry 122. For example, circuitry 28 may update RSSI patterns 132 as it learns the behavior of the user or to account for any changes in the behavior of the user over time. In this way, RSSI patterns 132 may be reflective of typical operation of device 10 by a corresponding user. If desired, user RSSI patterns 132 may include patterns associated with the typical behavior of multiple users.

If desired, user statistics 128 may include event RSSI patterns stored on circuitry 28. Event RSSI patterns 134 may be predetermined patterns of RSSI values as a function of time and/or space that correspond to particular events associated with the operation of device 10 or actions performed by the user of device 10. For example, a given event RSSI pattern 134 may be a sequence of RSSI values as a function of time at a fixed location that is expected or predetermined to be associated with the user removing band 16 (e.g., a so-called band replacement event). As another example, a given event RSSI pattern may be a sequence of RSSI values as a function of time at a fixed location that is expected or predetermined to be associated with a user taking device 10 off of their wrist. As yet another example, a given event RSSI pattern may be a sequence of RSSI values as a function of time and location that is expected or predetermined to be associated with a user tightening or loosening strap 16 (e.g., a so-called strap adjustment event). As still another example, a given event RSSI pattern may be a sequence of RSSI values as a function of time that is expected or predetermined to be associated with the user's wrist 90 becoming wet.

Event RSSI patterns 134 may, if desired, be loaded onto device 10 during manufacture of device 10 (e.g., calibration data). If desired, storage and processing circuitry 28 may continually update (train) event RSSI patterns 134 based on real time RSSI measurements performed by circuitry 122. For example, circuitry 28 may update RSSI patterns 134 as it learns how antenna 40 performs as various events or actions are performed. Each RSSI pattern 134 may include identifier information identifying the type of event that it represents (e.g., a particular RSSI pattern 134 may be labeled as corresponding to a strap replacement event performed by a first user, whereas another RSSI pattern may be labeled as corresponding to a strap adjustment event performed by a second user, etc.). In this way, RSSI patterns 134 may be reflective of events that may occur during operation of device 10 by a corresponding user. If desired, user RSSI patterns 132 and/or event RSSI patterns 134 may be omitted.

Storage and processing circuitry 28 may process gathered RSSI data 126, user RSSI patterns 132, event RSSI patterns 134, other user statistics 128, and/or other information in determining when to adjust matching circuitry 111 and/or how to adjust matching circuitry 111 to compensate for different loading conditions of antenna 40. Matching settings 130 for matching circuitry 111 may be stored on storage and processing circuitry 28. Matching settings 130 may identify particular impedance matching settings for matching circuitry 111 to be used during communications operations. Matching settings 130 may be stored on one or more data structures on circuitry 28.

Storage and processing circuitry 28 may identify the particular loading condition for antenna 40 at any given time (e.g., based on RSSI data 126 gathered by circuitry 122, user RSSI patterns 132, event RSSI patterns 134, and/or other information). Processing circuitry 28 may retrieve an appropriate matching setting 130 corresponding to the identified loading condition and may control matching circuitry 111 to implement that setting. For example, processing circuitry 28 may place matching circuitry 111 in a first setting 130 when processing circuitry 28 identifies that antenna 40 is in the presence a dry wrist 90 whereas processing circuitry 28 places matching circuitry 111 in a second setting 130 when processing circuitry 28 identifies that antenna 40 is in the presence of a wet wrist 90.

Matching settings 130 may, if desired, be loaded onto device 10 during manufacture of device 10 (e.g., using factory-calibrated settings). If desired, storage and processing circuitry 28 may continually update or overwrite matching settings 130 based on real time RSSI measurements performed by circuitry 122. For example, circuitry 28 may update matching settings 130 as it learns what particular settings best match antenna 40 under a variety of loading conditions. In another suitable arrangement, circuitry 28 may sweep through different possible matching settings until a satisfactory matching setting is found.

In this way, storage and processing circuitry 28 may continue to monitor the performance of antenna 40 for changes in antenna loading and may actively adjust matching circuitry 111 to compensate for such changes in real time. These adjustments may thereby dynamically and adaptively compensate for any potential deteriorations in antenna performance that arise as a result of different users operating device 10, different orientations of device 10 on the user's wrist 90, different strap tightness, different strap materials, presence of water or moisture adjacent to or on device 10, or any other environmental variations affecting the loading of antenna 40 that may arise during normal use of device 10.

The example of FIG. 6 is merely illustrative. If desired, storage and processing circuitry 28 may use gathered RSSI data in combination with phase and magnitude measurements gathered using coupler 110 in determining how to adjust matching circuitry 111. Coupler 110 and feedback receiver circuitry 104 may be omitted in scenarios where phase and magnitude measurements are not used in adjusting matching circuitry 111. Similarly, measurement circuitry 122 may be omitted in scenarios where RSSI measurements are not used in adjusting matching circuitry 111. If desired, antenna 40 may include a single antenna that transmits signals TX and that conveys receive signals RX to measurement circuitry 122. In another suitable arrangement, a first antenna 40 may be used to transmit signals TX from coupler 110 whereas a second antenna 40 is used to receive signals RX for gathering RSSI data. In general, wireless communications circuitry 34 may include any desired circuitry arranged in any desired manner. Circuitry 102, 104, and 106 in transceiver circuitry 56 may each be implemented using respective integrated circuits or may be formed on together on one or more shared integrated circuits.

Figure 7:
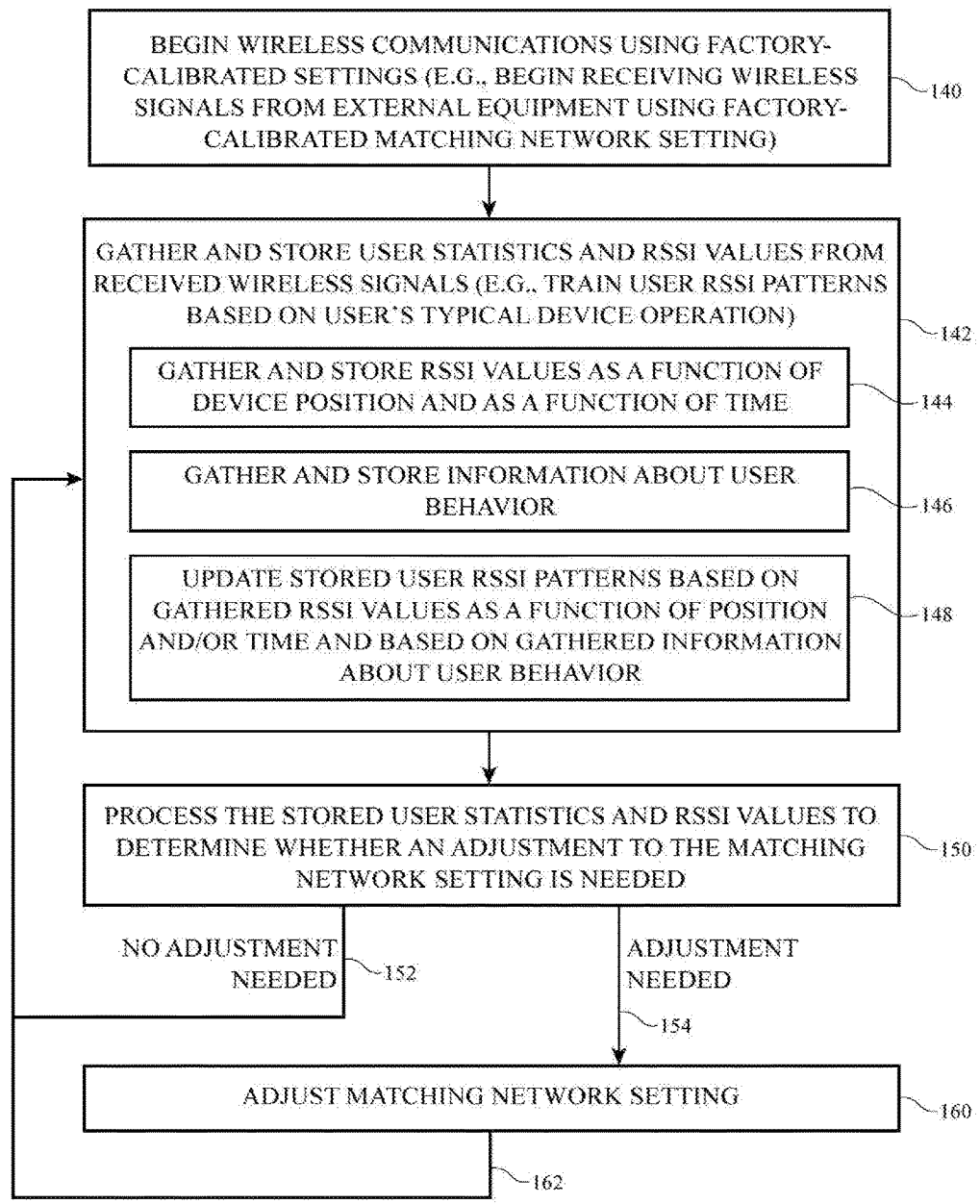
FIG. 7 is a flow chart of illustrative steps involved in operating an electronic device having adjustable wireless circuitry to compensate for different antenna loading conditions in accordance with an embodiment.

FIG. 7 is a flow chart of illustrative steps that may be performed by device 10 in gathering and processing RSSI data for adjusting matching circuitry 111. The steps of FIG. 7 may, for example, be performed by device 10 to compensate for variations in antenna loading in real time (e.g., so that an optimal antenna efficiency is maintained regardless of how device 10 is being worn, who is wearing device 10, etc.).

At step 140, wireless communications circuitry 34 may begin wireless communications using factory calibrated settings. For example, storage and processing circuitry 28 may identify a factory calibrated matching setting 130 that corresponds to the particular frequency to be used for communications. The factory calibrated settings may be loaded onto circuitry 28 during manufacture of device 10. The factory calibrated settings may not provide sufficient impedance matching for antenna 40 under all real world antenna loading conditions, for example. Wireless communications circuitry 34 may transmit signals TX to external devices such as external devices 52 (FIG. 2) and may receive signals RX from external devices 52 (e.g., using the factory calibrated settings).

At step 142, storage and processing circuitry 28 may gather RSSI values 126 from wireless signals that are received from external devices 52 (e.g., as measured by receive signal strength measurement circuitry 122 of FIG. 6). Storage and processing circuitry 28 may track the location of device 10 while the RSSI values are gathered. As device 10 performs wireless communications, circuitry 28 may continue to gather and store RSSI values from the received signals as a function of the position of device 10 and/or as a function of time (step 144).

Device 10 may also gather user statistics 128 based on the transmitted and received signals. For example, storage and processing circuitry 28 may store information about the behavior of the user as user statistics 128 (step 146). The behavioral information may include information on where the user is typically located at different times of day, activities that are preformed typically by the user, or other information associated with user behavior. If desired, one or more sensors in input-output devices 32 (FIG. 2) may be used to help track the user's behavior. For example, ambient light sensors and/or motion sensors on device 10 may be used to identify times or device locations when the user is typically stationary, asleep, moving, etc. As another example, strap sensors, proximity sensors, touch sensors, or other sensors may be used to identify when the user removes or adjusts strap 16.

If desired, storage and processing circuitry 28 may update stored RSSI patterns 132 and 134 based on the gathered RSSI data and on the gathered information about user behavior (step 148). Storage and processing circuitry 28 may identify and store user RSSI patterns 132 that are associated with typical use of device 10 by one or more users. Storage and processing circuitry 28 may identify and store event RSSI patterns 134 that are associated with various events or activities that may affect the loading of antenna 40. For example, storage and processing circuitry 28 may compare user statistics 128 to gathered RSSI data 126 to identify a pattern in the gathered RSSI data that typically occurs when the user is removes or adjusts strap 16. The identified pattern may be stored as a given one of event RSSI patterns 134. Similarly, storage and processing circuitry 28 may identify patterns in gathered RSSI data 126 that are typical of normal wear by the user (e.g., patterns associated with normal motion of the user's arms or other typical user activities that do not necessarily detune antenna 40). These identified patterns may be stored as user RSSI patterns 132. Throughout the lifetime of device 10, storage and processing circuitry 28 may continue to update and refine (e.g., train) user RSSI patterns 132, event RSSI patterns 134, and/or other user statistics 128 based on the behavior of the user of device 10 and gathered RSSI data. The example of FIG. 7 is merely illustrative. If desired, steps 144, 146, and/or 148 may be omitted. Steps 144, 146, and/or 148 may be performed concurrently or at different times.

At step 150, storage and processing circuitry 28 may process gathered user statistics 128 and gathered RSSI data 126 to determine whether an adjustment to matching circuitry 111 is needed. The adjustment to the matching circuitry may be needed when a change in the loading conditions of antenna 40 or detuning of antenna 40 due to the presence external objects are detected in the gathered RSSI data. User statistics 128 may be used to filter and/or identify patterns in gathered RSSI data 126 that are indicative of such changes, for example. If desired, step 150 may be performed concurrently with some or all of step 142 (e.g., storage and processing circuitry 28 may continue to gather and store data while also performing data processing).

If processing circuitry 28 determines that no adjustment is needed (e.g., if no changes in antenna loading or antenna detuning are detected), processing may loop back to step 142 as shown by path 152 to continue to gather and store RSSI data and user statistics. If processing circuitry 28 determines that an adjustment is needed (e.g., if a change in antenna loading or antenna detuning is detected), processing may proceed to step 160 as shown by path 154.

At step 160, storage and processing circuitry 28 may adjust matching circuitry 111 to compensate for the detected change in antenna loading/detuning. For example, storage and processing circuitry 28 may provide control signals CTRL over path 116 (FIG. 6) to control circuitry 111 to implement a desired matching setting. Wireless communications circuitry 34 may continue to perform wireless communications operations using the adjusted matching setting. Processing may subsequently loop back to step 142 as shown by path 162 to continue to gather and store RSSI data and user statistics.

Figure 8:
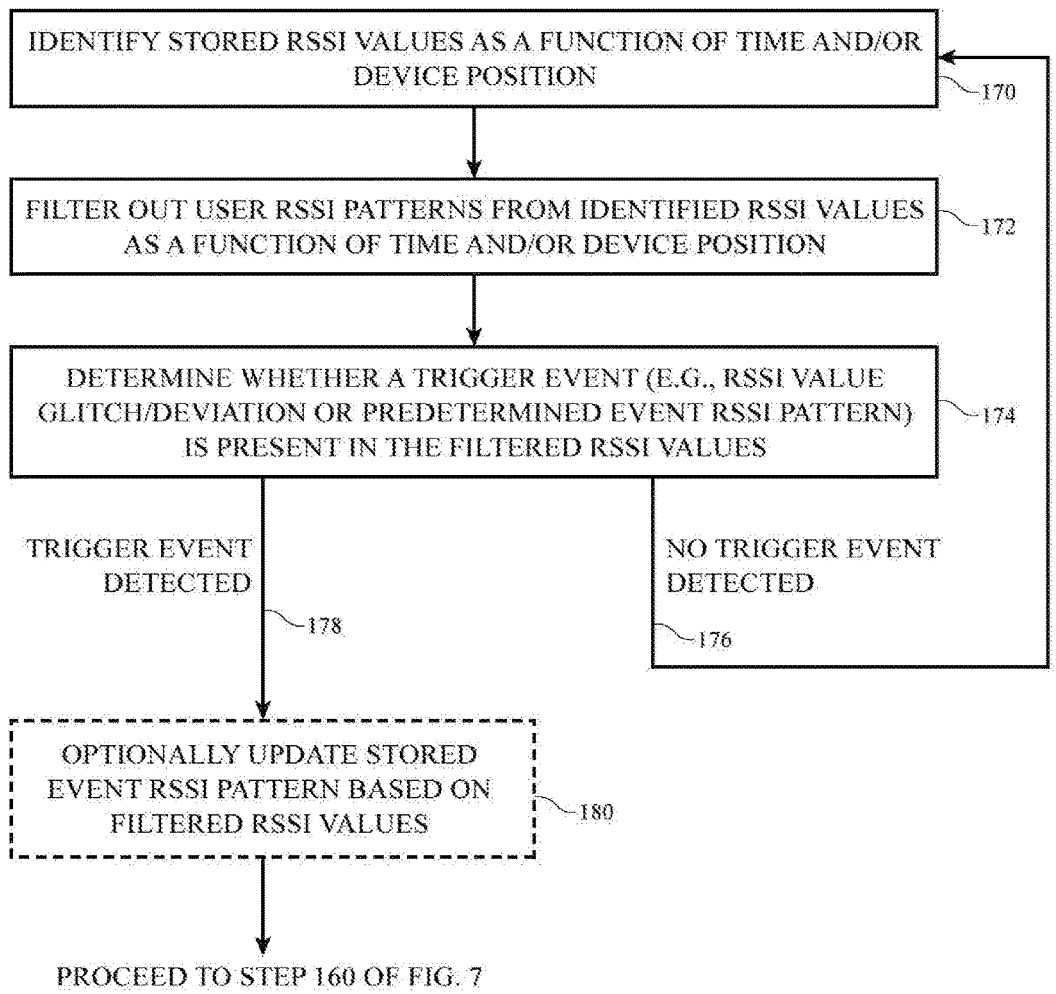
FIG. 8 is a flow chart of illustrative steps that may be performed by an electronic device in determining whether to adjust an impedance matching circuit to compensate for different antenna loading conditions in accordance with an embodiment.

FIG. 8 is a flow chart of illustrative steps that may be performed by storage and processing circuitry 28 to determine when to perform an adjustment to matching circuitry 111. The steps of FIG. 8 may, for example, be performed while processing step 150 of FIG. 7.

At step 170, processing circuitry 28 may identify a sequence of RSSI values as a function of time and/or device position in gathered RSSI data 126. For example, processing circuitry 28 may identify a set of the most recently gathered RSSI values from gathered RSSI data 126.

At step 172, processing circuitry 28 may perform filtering operations on the identified RSSI values. For example, processing circuitry 28 may filter out a user RSSI pattern 132 as a function of time from the identified RSSI values as a function of time. User RSSI pattern 132 may be a factory-calibrated pattern that is stored on device 10 during manufacture and/or may be a pattern that is stored and updated on device 10 during normal operation (e.g., while processing step 148 of FIG. 7). In this way, processing circuitry 28 may filter out a baseline from the gathered RSSI data that is otherwise associated with normal operation of device 10 by the user. As another example, processing circuitry 28 may filter out a constant baseline RSSI value from the identified RSSI values.

At step 174, processing circuitry may determine whether a trigger event is present in the filtered RSSI values. As one example, the trigger event may be a glitch in the filtered RSSI values. Processing circuitry 28 may determine that a glitch is present if a portion of the filtered RSSI values as a function of time has a slope that exceeds a positive slope threshold value or a slope that is less than a negative slope threshold value. As another example, the trigger event may be an excessive deviation in the filtered RSSI values. Processing circuitry 28 may determine that an excessive deviation is present if the filtered RSSI values include values that are less than a predetermined minimum threshold RSSI value or greater than a predetermined maximum threshold RSSI value. As yet another example, processing circuitry 28 may compare the filtered RSSI values to one or more predetermined event RSSI patterns 134 to determine whether one of the event RSSI patterns is present in the filtered RSSI values. Predetermined event RSSI patterns 134 may be factory-calibrated patterns that are stored on device 10 during manufacture and/or may be patterns that are stored and updated on device 10 during normal operation (e.g., while processing step 148 of FIG. 7). Processing circuitry 28 may identify that a trigger event is present when a particular sequence of the filtered RSSI values sufficiently matches a stored event RSSI pattern 134 such as an RSSI pattern associated with a user removing or adjusting strap 16. In this scenario, the trigger event may be the event RSSI pattern that was detected in the filtered data. Stored event RSSI patterns 134 may include, as examples, sequences of RSSI values corresponding to different users wearing device 10, the tightening or loosening of strap 16, the presence or absence of water or moisture on strap 16, device 10, and/or wrist 90, a change in position or orientation of device 10 on wrist 90, etc.

If desired, processing circuitry 28 may compute a probability that a trigger event is present based on a combination of the filtered RSSI values, user statistics 128, and/or other information. If the computed probability exceeds a minimum probability threshold then processing circuitry 28 may determine that the trigger event is present. If the computed probability is less than or equal to the minimum probability threshold, then processing circuitry 28 may determine that no trigger event is detected. As an example, processing circuitry 28 may identify a relatively large degradation in the filtered RSSI values (e.g., an excessive deviation of RSSI values as a function of time that is below a predetermined minimum threshold RSSI value). Processing circuitry 28 may combine this information with information identifying that the filtered RSSI values were gathered during the afternoon while the device was located at the user's work location to determine that there is a relatively high probability that a trigger event such as a strap change trigger event associated with the user changing strap 16 is present in the gathered RSSI values.

If no trigger event is detected (e.g., if no glitch, excessive deviation, or predetermined RSSI pattern is present) in the filtered RSSI values, processing may loop back to step 170 as shown by path 176. Processing circuitry 28 may then continue to search for the presence of trigger events in subsequently gathered RSSI values as a function of time and/or device position (e.g., as updated RSSI values and user statistics are gathered during device operation). If a trigger event is detected, processing may proceed to optional step 180 as shown by path 178.

At optional step 180, processing circuitry 28 may update stored event RSSI patterns 134 based on the filtered RSSI values. For example, sensor data, user input, or other information may be used to identify that a particular user action or environmental event occurred when the trigger event was detected. The pattern (sequence) of gathered RSSI data as a function of time and/or device position associated with that user action or environmental event may be stored as an event RSSI pattern 134 on circuitry 28 for future processing. For example, that pattern may be used to identify similar trigger events in the future if desired. Processing may subsequently proceed to step 160 of FIG. 7 to adjust matching network 111.

Figure 9:
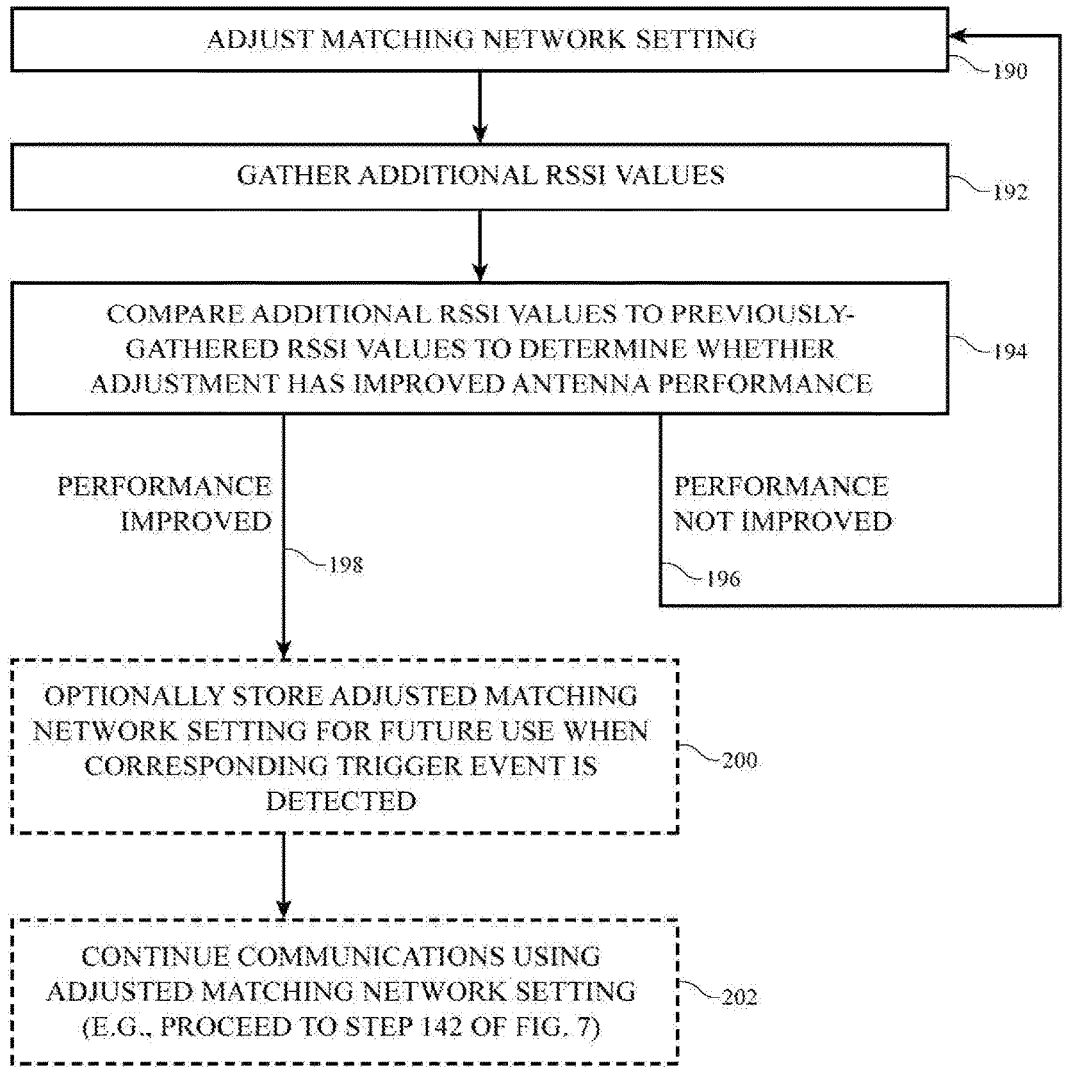
FIGS. 9 and 10 are flow charts of illustrative steps that may be performed by an electronic device in adjusting an impedance matching circuit to compensate for different antenna loading conditions in accordance with an embodiment.

FIG. 9 is a flow chart of illustrative steps that may be performed by processing circuitry 28 for dynamically adjusting matching network 111 in response to detecting a trigger event. The steps of FIG. 9 may, for example, be performed while processing step 160 of FIG. 7.

At step 190, processing circuitry 28 may perform an adjustment to matching circuitry 111. For example, processing circuitry 28 may control one or more components within circuitry 111 to adjust the impedance of circuitry 111.

At step 192, processing circuitry 28 may gather additional RSSI values using the adjusted matching circuitry (e.g., while the matching circuitry exhibits the adjusted impedance).

At step 194, processing circuitry 28 may determine whether performance of antenna 40 has improved by comparing the gathered additional RSSI values to RSSI values that were gathered before the adjustment was made. For example, processing circuitry 28 may determine that the antenna performance has improved if the additional RSSI values are greater than the RSSI values that were gathered prior to the adjustment. If the antenna performance has not improved (e.g., if the additional RSSI values gathered at step 192 are less than or equal to the RSSI values gathered prior to the adjustment), processing may loop back to step 190 as shown by path 196 and the matching circuitry may be further adjusted. In another suitable arrangement, the adjustment performed at step 190 may be reverted and processing may proceed to step 142 of FIG. 7. If the antenna performance has improved, processing may proceed to optional step 200 as shown by path 198.

The example of FIG. 9 in which the gathered RSSI values are compared to previously-gathered RSSI values is merely illustrative. If desired, processing circuitry 28 may compare the additional RSSI values gathered at step 192 to a predetermined threshold value. The predetermined threshold value may be determined by industry standards, design standards, regulatory standards, manufacturing standards, or by any other means. The predetermined threshold value may be, for example, a minimum RSSI value for which satisfactory link quality between device 10 and external equipment 52 may be maintained. If the additional RSSI values are greater than the predetermined threshold value, processing may proceed to step optional step 200 as shown by path 198. If the additional RSSI values are less than or equal to the predetermined threshold value, processing may loop back to step 190 as shown by path 196.

At optional step 200, processing circuitry 28 may store the adjusted matching network setting as an entry in matching settings 130 (FIG. 6). Processing circuitry 28 may use the stored matching network setting for performing future adjustments to circuitry 111. For example, processing circuitry 28 may use a particular matching network setting 130 whenever the corresponding trigger event that led to the matching circuit adjustment is detected in the future. Processing may subsequently proceed to step 202.

At step 202, wireless communications circuitry 34 may continue communications using the adjusted matching network setting (e.g., processing may proceed to step 142 of FIG. 7). In this way, processing circuitry 28 may sweep through a number of possible settings for matching network 111 while continuing to gather RSSI data until a setting is found that improves or optimizes antenna performance. This example is merely illustrative. In another suitable arrangement, predetermined matching settings 130 may be used in adjusting matching network 111.

Figure 10:
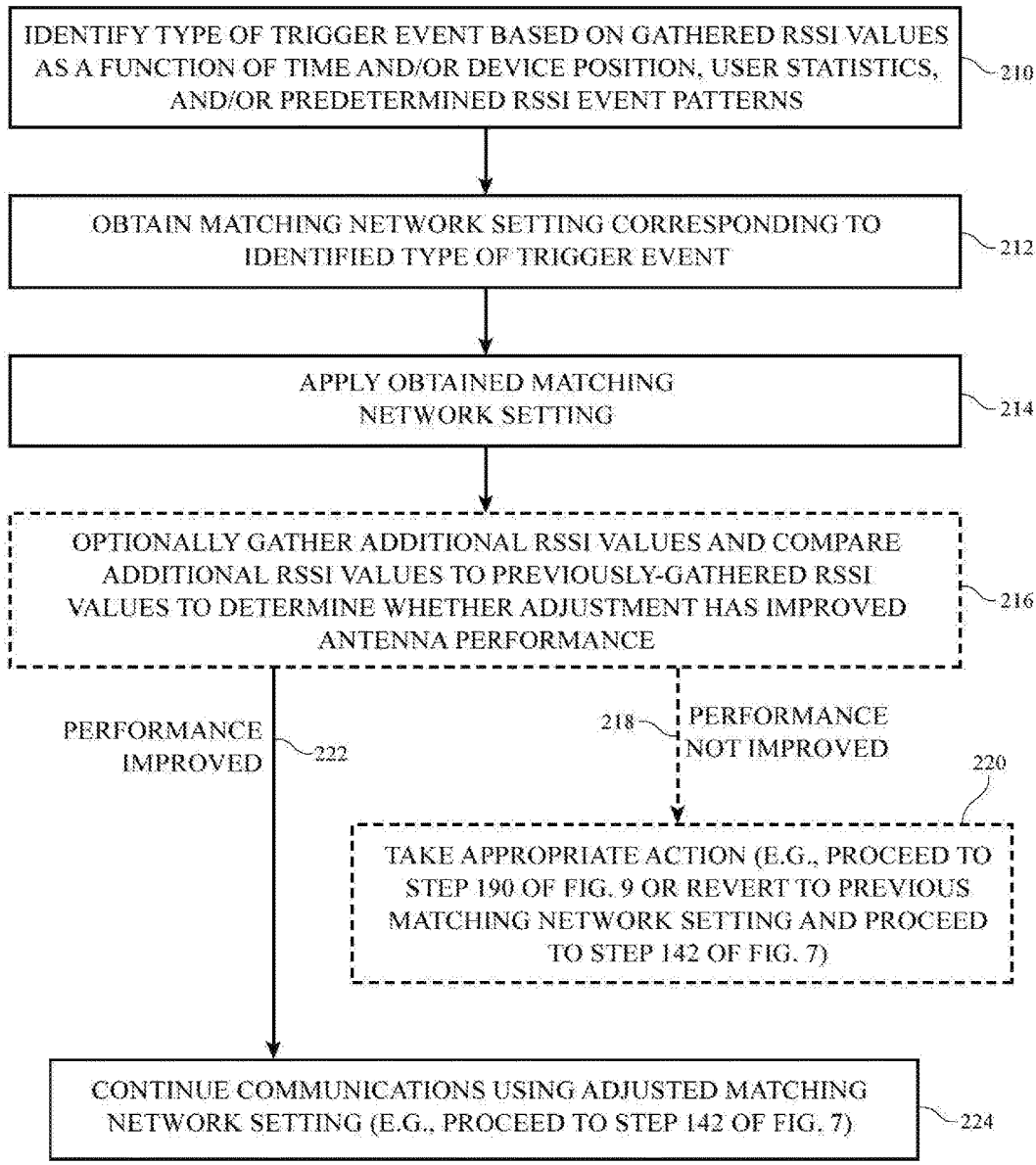

FIG. 10 is a flow chart of illustrative steps that may be performed by processing circuitry 28 for adjusting matching network 111 based on predetermined matching settings 130 in response to detecting a trigger event. The steps of FIG. 10 may, for example, be performed while processing step 160 of FIG. 7.

Each trigger event may have a type corresponding to the environmental/antenna loading factors that caused it to be present in the gathered RSSI data. At step 210, processing circuitry 28 may identify the type of trigger event that was detected based on the filtered RSSI values as a function of time and/or device position, user statistics 128, user input, sensor data, and/or event RSSI patterns 134. The types of trigger events may include trigger events associated with the user adjusting the location or orientation of device 10 on their wrist, the user adjusting the distance between their wrist and antenna 40 (e.g., by tightening or loosening strap 16), the user swapping out strap 16 for a different strap, a different user wearing device 10, strap 16, device 10, or wrist 90 becoming wet or dry, when a part of the user's clothing such as a shirt sleeve is placed between or removed from between device 10 and wrist 90, or any other environmental factors that may affect loading of antenna 40.

As an example, processing circuitry 28 may identify that a trigger event associated with a strap replacement (e.g., a strap replacement type trigger event or strap replacement trigger event) has occurred if the filtered RSSI values match an event RSSI pattern 134 associated with replacing strap 16, if a strap sensor in device 10 detects that strap 16 has been replaced, or based on any other desired information. For example, processing circuitry 28 may identify the trigger event as a strap replacement trigger event if a relatively large degradation in the filtered RSSI values is measured during the afternoon while the device was located at the user's work location. As another example, processing circuitry 28 may identify the user removing device 10 from their wrist as the type of trigger event in response to identifying that the gathered RSSI data included a rapid increase in measured RSSI values over time and that the increase occurred during the evening after the user's location has changed from a work location to a home location (e.g., user statistics 128 may identify that this set of conditions has a high probability of being associated with the user removing device 10 from their wrist). As yet another example, processing circuitry 28 may identify the user tightening strap 16 as the type of trigger event in response to identifying that the gathered RSSI values have decreased over a relatively short amount of time while also identifying that the device location did not change during that amount of time. These examples are merely illustrative and, in general, processing circuitry 23 may process any desired combination of the gathered RSSI information as a function of device position and/or time, user input, sensor data, event patterns 134, and other user statistics 128 in identifying the type of trigger event.

At step 212, processing circuitry 28 may obtain a particular matching setting 130 corresponding to the identified type of trigger event (e.g., a first matching setting if the trigger event is identified as being associated with the user changing strap 16, a second matching setting if the trigger event is identified as being associated with the user's skin becoming wet, a third matching setting if the trigger event is identified as being associated with a different user wearing device 10, a fourth matching setting if the trigger event is identified as being associated with device 10 being positioned at orientation 94 of FIG. 5, a fifth matching setting if device 10 is positioned at orientation 96 of FIG. 5, etc.). The obtained matching setting 130 may be loaded onto device 10 during manufacture of device 10 for use whenever the corresponding type of trigger event is detected or the obtained matching setting may be stored on processing circuitry 28 while processing step 148 of FIG. 7.

At step 214, processing circuitry 28 may apply the obtained matching setting 130 to matching network 111 (e.g., circuitry 28 may configure matching network 111 to exhibit an impedance associated with the obtained matching setting). Processing may subsequently proceed to optional step 216.

At optional step 216, processing circuitry 28 may gather additional RSSI values while the adjusted matching circuitry is configured using the obtained matching network setting. Processing circuitry 28 may determine whether performance of antenna 40 has improved by comparing the gathered additional RSSI values to RSSI values that were gathered before the adjustment was made. If the antenna performance has not improved (e.g., if the additional RSSI values gathered at step 216 are less than or equal to the RSSI values gathered prior to the adjustment), processing may proceed to step 220.

At step 220, processing circuitry 28 may take appropriate action. For example, processing circuitry 28 may proceed to step 190 of FIG. 9 to begin sweeping through additional matching network settings until a satisfactory setting has been found. As another example, processing circuitry 28 may control matching circuitry 111 to revert to the previous matching setting and processing may proceed to step 142 of FIG. 7 to continue to gather and process user statistics and RSSI values. If the antenna performance has improved (e.g., if the additional RSSI values gathered at step 216 are greater than the RSSI values gathered prior to the adjustment), processing may proceed to step 222. In scenarios where optional step 216 is not performed, processing may proceed directly from step 214 to step 224.

The example of FIG. 10 in which the gathered RSSI values are compared to previously-gathered RSSI values is merely illustrative. If desired, processing circuitry 28 may compare the additional RSSI values gathered at step 216 to a predetermined threshold value. If the additional RSSI values are greater than the predetermined threshold value, processing may proceed to step 224 as shown by path 222. If the additional RSSI values are less than or equal to the predetermined threshold value, processing may proceed to step 220 as shown by path 218.

At step 224, wireless communications circuitry 34 may continue communications using the adjusted matching network setting (e.g., processing may proceed to step 142 of FIG. 7). In this way, processing circuitry 28 may select and use predetermined matching settings 130 based on the gathered RSSI data. This may allow for faster antenna adjustment than in scenarios where processing circuitry 28 sweeps through different settings (e.g., as in FIG. 9), but may be less adaptable to changing or unpredictable environmental conditions (e.g., conditions for which there may not already be optimized matching settings stored on circuitry 28).

Figure 11:
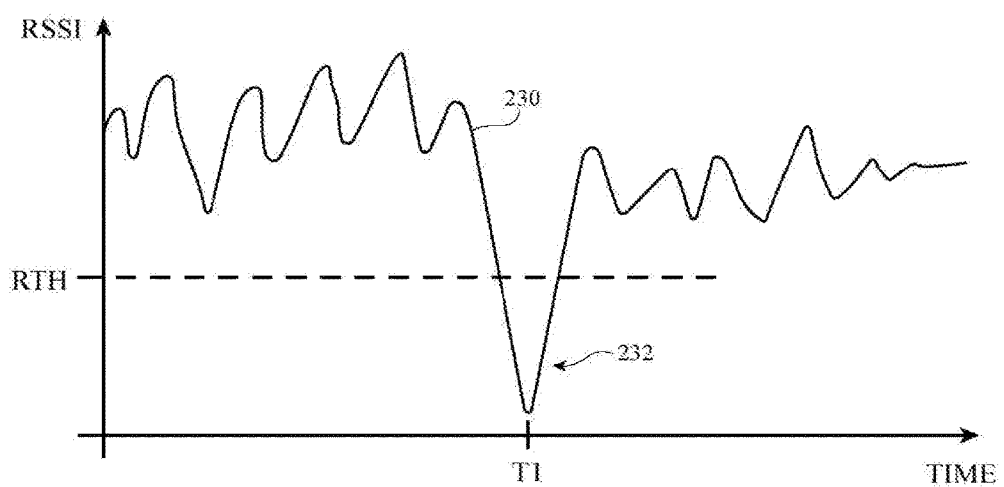
FIG. 11 is an illustrative plot of receive signal strength information gathered by an electronic device that may be processed to determine whether to adjust an impedance matching circuit in accordance with an embodiment.

FIG. 11 is an illustrative plot of gathered RSSI values as a function of time that shows how gathered RSSI data 126 may be compared to a predetermined threshold for detecting the presence of a trigger event. As shown in FIG. 11, curve 230 plots gathered RSSI values as a function of time and at a fixed position (e.g., as gathered while processing step 144 of FIG. 7). Gathered RSSI values 230 may vary over time as the user wears device 10. Relatively small variations in values 230 may have little effect on the overall performance of antenna 40. However, relatively large variations may result in unsatisfactory antenna performance.

Processing circuitry 28 may process RSSI values 230 to identify a trigger event (e.g., while processing step 174 of FIG. 8). In the example of FIG. 11, processing circuitry 28 may compare RSSI values 230 to predetermined threshold value RTH. Processing circuitry 28 may determine that a trigger event is present because RSSI values 230 fall below threshold value RTH. This example is merely illustrative. If desired, processing circuitry 28 may identify the slope of RSSI values 230 and may compare the slope to a predetermined slope threshold for identifying the presence of the trigger event. In another suitable arrangement, processing circuitry 28 may identify the presence and type of trigger event when RSSI values 230 match a predetermined event RSSI pattern 134. The example of FIG. 11 in which RSSI values as a function of time for a set location are processed is merely illustrative. In general, processing circuitry 28 may process RSSI values as a function of position at a fixed time or as a function of both position and time (e.g., a multi-dimensional surface of gathered RSSI values) for identifying the presence and type of trigger event.

Figure 12:
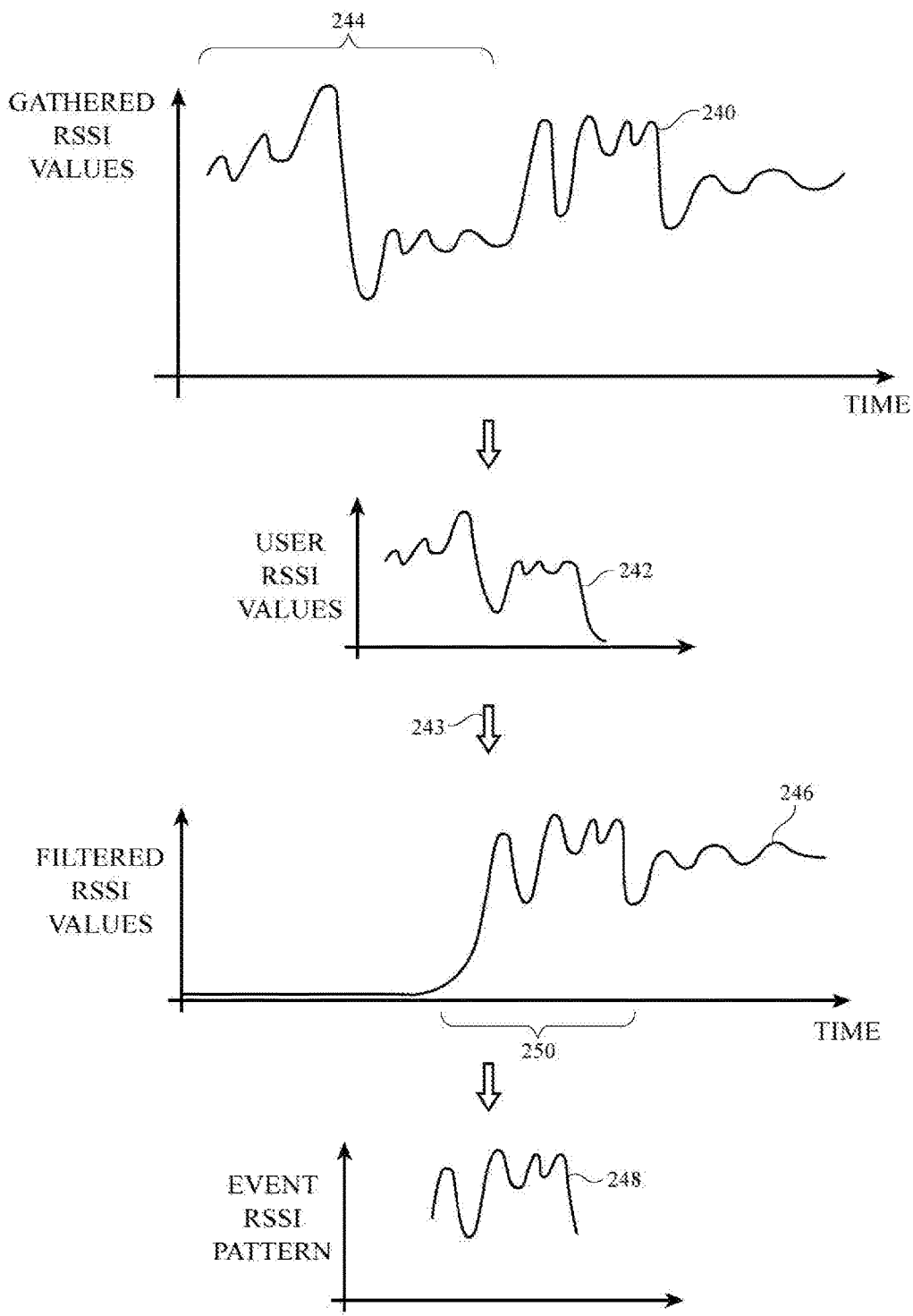
FIG. 12 is a diagram showing how receive signal strength information gathered by an illustrative electronic device may be filtered and compared to predetermined receive signal strength patterns to determine whether to adjust an impedance matching circuit in accordance with an embodiment.

FIG. 12 is an illustrative diagram showing how processing circuitry 28 may process gathered RSSI values using predetermined user and event RSSI patterns to identify the presence of a trigger event.

As shown in FIG. 12, curve 240 plots gathered RSSI values as a function of time (e.g., at a fixed device location). Curve 242 plots a particular user RSSI pattern 132 (e.g., RSSI values as a function of time as accumulated while processing step 148 of FIG. 7). User RSSI pattern 242 may be indicative of typical RSSI data as a function of the same position and time values represented by curve 240. User RSSI pattern 242 may be trained and updated over time as processing circuitry 28 continues to gather information about the behavior of the user (e.g., as user statistics 128 are updated).

User RSSI pattern 242 may be used to filter gathered RSSI values 240 (e.g., while processing step 172 of FIG. 8). In the example of FIG. 12, user RSSI pattern 242 is filtered (subtracted) from gathered RSSI values 240 as shown by arrow 243 to generate filtered RSSI values 246 (e.g., portion 244 of curve 240 matching user pattern 242 may be removed from filtered curve 246). In this way, user RSSI pattern 242 may serve as a baseline measurement from which to process the gathered RSSI values for identifying trigger events.

Processing circuitry 28 may process filtered RSSI values 246 to determine whether a predetermined event RSSI pattern is present in the filtered data (e.g., while processing step 174 of FIG. 8). In the example of FIG. 12, processing circuitry 28 may identify that portion 250 of filtered RSSI values 246 matches a given event RSSI pattern 248. Event RSSI pattern 248 may, for example, be stored on processing circuitry 28 while processing step 180 of FIG. 8, while processing step 148 of FIG. 7, or during factory calibration. As one example, event RSSI pattern 248 may be an RSSI pattern associated with a strap tightening trigger event. The presence of event RSSI pattern 248 within filtered RSSI data 246 may be indicative of the user tightening strap 16. Processing circuitry 28 may subsequently identify a matching setting 130 corresponding to the strap tightening trigger event (e.g., while processing step 210 of FIG. 10) for use during subsequent communication (e.g., at least until another trigger event is detected). In another suitable arrangement, processing circuitry may sweep through different matching network settings (e.g., while processing the steps of FIG. 9) until an optimal matching setting is found. Performing the matching network adjustment may allow matching network 111 to match antenna 40 even after the environment around antenna 40 has changed the antenna loading (e.g., after the loading of the antenna has changed as a result of the tightening of strap 16). By providing suitable matching for antenna 40, antenna efficiency may be maximized regardless of how the user is wearing device 10 or regardless of who is wearing device 10.

The example of FIG. 12 is merely illustrative. In general, the gathered RSSI values may have any desired shape as a function of time and/or space. Similarly, user RSSI pattern 242 and event RSSI pattern 248 may have any desired shape.

Figure 13:
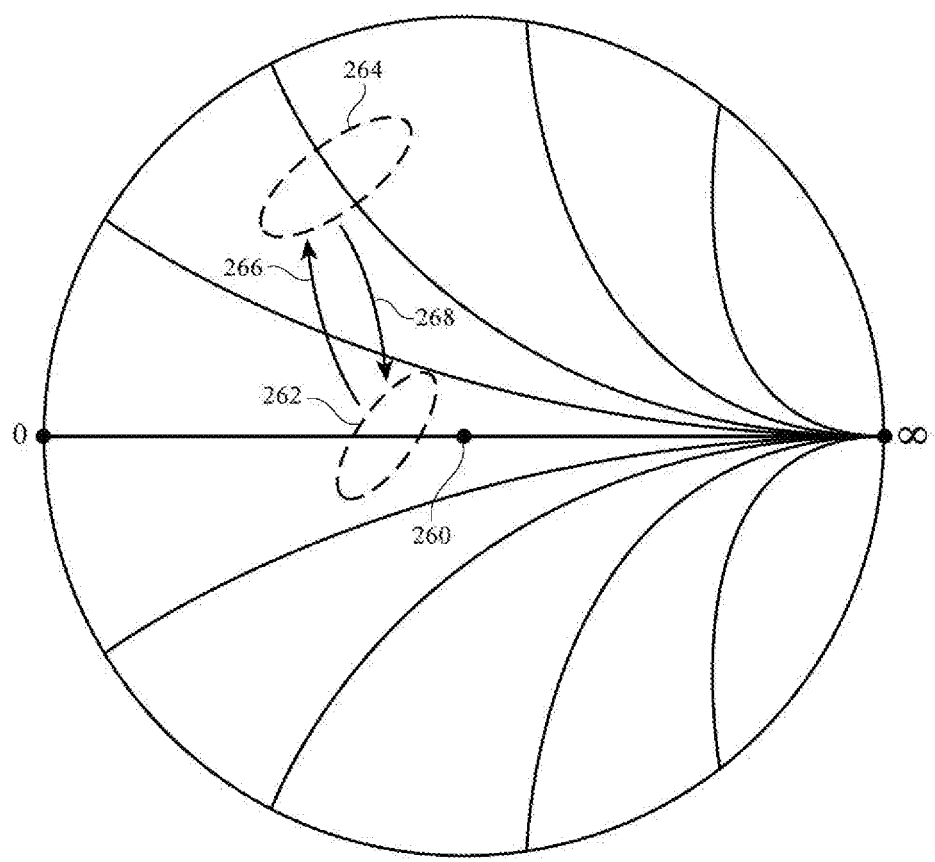
FIG. 13 is a Smith chart showing illustrative impedances associated with operation of an antenna in an electronic device when operated under different antenna loading conditions in accordance with an embodiment.

FIG. 13 is a Smith chart showing how adjusting matching circuitry 111 may affect antenna performance differently under a particular antenna loading condition. In the Smith chart of FIG. 13, antenna impedances for antenna 40 are measured as a function of different operating conditions. A fifty ohm antenna impedance is characterized by impedance point 260 in the chart of FIG. 13. An antenna with an impedance close to point 260 may be considered well matched to a fifty ohm transmission line in device 10 (e.g., transmission line 60).

Antenna 40 may exhibit an impedance within region 264 of FIG. 13 when tuned to a first matching network setting while device 10 is operated under a first antenna loading condition (e.g., when device 10 is oriented at position 94 of FIG. 5). Region 264 is relatively far from point 260, indicating a relatively high level of antenna detuning. Processing circuitry 28 may identify this detuning by gathering phase and magnitude information using coupler 110 (FIG. 6) and/or by identifying a trigger event in the gathered RSSI data. In order to compensate for this detuning, control circuitry 28 may adjust matching circuitry 111 to tune antenna 40 to a second matching network setting as shown by arrow 268 (e.g., while processing step 160 of FIG. 7). After being tuned to the second matching network setting, antenna 40 may exhibit an impedance within region 262. Region 262 is closer to point 260 than region 264, indicating a lower level of antenna detuning than when operated under the second matching network setting associated with region 262. In this way, control circuitry 28 may compensate for the detuning of antenna 40 caused by the variable amount of antenna loading associated with the user wearing device 10 at different orientations.

However, antenna 40 may exhibit a different impedance when device 10 is oriented at position 96 of FIG. 5. If the user changes the orientation of device 10 from orientation 94 to orientation 96, the impedance of antenna 40 may shift to a region that is farther from point 260 such as region 264 as shown by path 266, indicating a relatively high level of antenna detuning. Processing circuitry 28 may subsequently identify this detuning and may adjust matching circuitry 111 to the first matching network setting. This may shift the impedance of antenna 40 closer to point 260 to reduce the detuning of antenna 40. In this way, processing circuitry 28 may actively adjust matching circuitry 111 to compensate for loading variations of antenna 40 during normal operation. This example is merely illustrative. In general, processing circuitry 28 may adjust matching circuitry 111 to compensate for any changes in antenna loading due to any suitable event (e.g., the user changing straps, the user tightening strap 16, a different user with a different wrist physiology wearing device 10, water coming into contact with wrist 90 or device 10, or any other variation in the operating environment of antenna 40).

Figure 14:
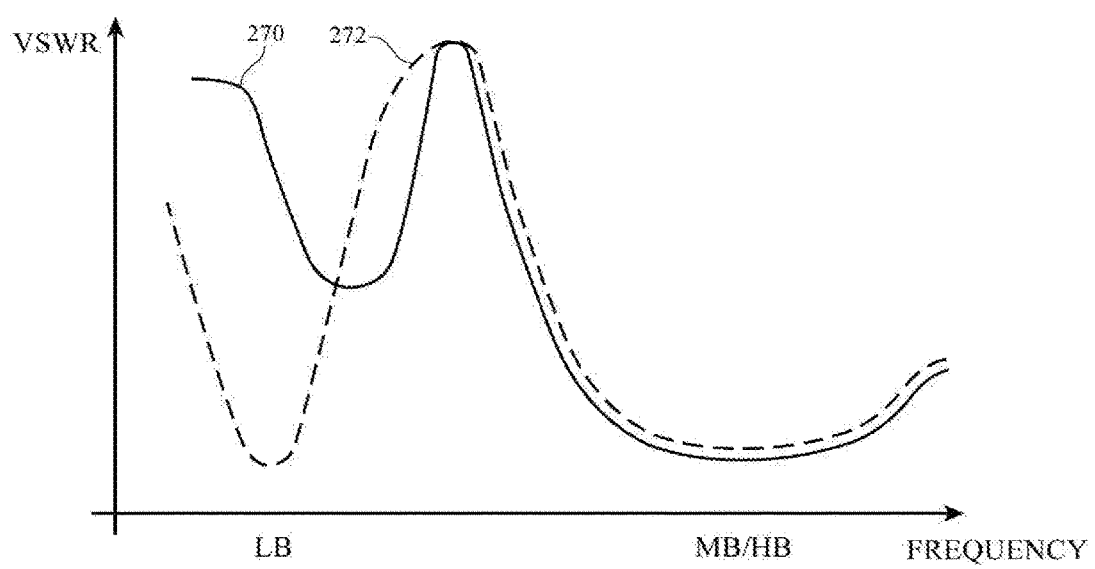
FIG. 14 is a graph of illustrative antenna frequency responses that may be exhibited by an antenna when operating under different impedance matching circuit settings in accordance with an embodiment.

FIG. 14 is a graph of illustrative antenna frequency responses that may be exhibited by an antenna when operating under different impedance matching circuit settings in accordance with an embodiment. In particular, FIG. 14 plots antenna response (voltage standing wave ratio (VSWR)) as a function of operating frequency. As shown in FIG. 14, solid curve 270 represents the response of antenna 40 when operating under a first matching network setting and a first antenna loading condition. For example, curve 270 may be associated with a first user wearing device 10 while matching network 111 is set to the first setting. Antenna 40 may have a relatively high response for midband (MB) and high band (HB) frequencies but a relatively low and detuned response at low band (LB) frequencies.

Dashed curve 272 may represent the response of antenna 40 when operating under the first matching network setting and a second antenna loading condition. For example, curve 272 may be associated with a second user wearing device 10 while matching network 111 is set to the first setting. In this scenario, antenna 40 may have a relatively high response at low band frequencies (e.g., due to differing physiology between the first and second users loading antenna 40 differently). When the first user is wearing device 10, processing circuitry 28 may detect the relatively low response of antenna 40 at the low band frequencies (e.g., using phase and magnitude measurements and/or RSSI values as in connection with step 150 of FIG. 7). Processing circuitry 28 may subsequently adjust matching network 111 to a second setting that compensates for the difference in antenna loading resulting from the first user wearing device 10. After adjusting matching network 111 to the second setting, antenna 40 may exhibit a similar response to curve 272 when device 10 is worn by the first user. If the first user were to give device 10 to the second user to wear, the response of antenna 40 may shift to the response illustrated by curve 270. Processing circuitry 28 may detect this change and may subsequently adjust matching network 111 back to the first setting. After adjusting network 111 to the first setting, antenna 40 may exhibit a response as shown by curve 272. In this way, processing circuitry 28 may actively adjust circuitry 111 to compensate for changes in antenna loading and detuning in real time.

The example of FIG. 14 is merely illustrative. In general, antenna 40 may be operated in any desired number of different frequency bands and may have any desired response as a function of operating frequency. Antenna 40 may be detuned as a result of any change in environmental conditions. While the examples of FIGS. 1-14 are described in connection with a wristwatch device, similar operations may be performed by any desired electronic device.

The operations of device 10 (e.g., the operations of FIGS. 7-10) may be performed by control circuitry 28. During operation, this control circuitry (which may sometimes be referred to as processing circuitry, processing and storage, computing equipment, a computer, etc.) may be configured to perform the methods of FIGS. 7-10 and/or other operations (e.g., using dedicated hardware and/or using software code running on hardware such as control circuitry 28). Software code for performing these operations may be stored on non-transitory (tangible) computer readable storage media. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media. Software stored on the non-transitory computer readable storage media may be executed on the processing circuitry of control circuitry 28. The processing circuitry may include application-specific integrated circuits with processing circuitry, one or more microprocessors, or other processing circuitry.

The foregoing is merely illustrative and various modifications can be made to the described embodiments. The foregoing embodiments may be implemented individually or in any combination.

What is claimed is:

1. A method of operating a wearable electronic device having a display formed at a front face of the electronic device, a dielectric rear housing wall formed at a rear face of the electronic device, an antenna, and processing circuitry, the method comprising:
    with the antenna, transmitting and receiving radio-frequency signals through the dielectric rear housing wall;
    with the processing circuitry, gathering received signal strength indicator (RSSI) values associated with an amount of loading of the antenna by an external object through the dielectric rear housing wall; and
    with the processing circuitry, adjusting the antenna to compensate for a change in the amount of loading of the antenna by the external object through the dielectric rear housing wall, wherein adjusting the antenna comprises:
        generating filtered RSSI values by filtering the gathered RSSI values,
        detecting a trigger event based on the filtered RSSI values, and
        adjusting the antenna based on the detected trigger event.

2. The method defined in claim 1, wherein the wearable electronic device comprises radio-frequency transceiver circuitry and impedance matching circuitry coupled between the radio-frequency transceiver circuitry and the antenna and adjusting the antenna to compensate for the change in the amount of loading of the antenna by the external object through the dielectric rear housing wall comprises adjusting an impedance of the impedance matching circuitry.

3. The method defined in claim 1, wherein the antenna comprises a tunable component and adjusting the antenna to compensate for a change in the amount of loading of the antenna by the external object through the dielectric rear housing wall comprises adjusting the tunable component.

4. The method defined in claim 1, wherein detecting the trigger event comprises comparing the filtered RSSI values to a plurality of predetermined sets of RSSI values stored at the wearable electronic device.

5. A method of operating a wearable electronic device having a display formed at a front face of the electronic device, a dielectric rear housing wall formed at a rear face of the electronic device, an antenna, and processing circuitry, the method comprising:
    with the antenna, receiving radio-frequency signals from external equipment through the dielectric rear housing wall;
    with the processing circuitry, gathering information on an amount of loading of the antenna by an external object through the dielectric rear housing wall, wherein the information comprises Received Signal Strength Indicator (RSSI) values associated with the radio-frequency signals received from the external equipment through the dielectric rear housing wall; and
    with the processing circuitry, adjusting the antenna to compensate for a change in the amount of loading of the antenna by the external object through the dielectric rear housing wall based on the gathered RSSI values, wherein gathering the information on the amount of loading of the antenna comprises storing acquisition times associated with each of the gathered RSSI values and storing wearable electronic device acquisition positions associated with each of the gathered RSSI values.

6. The method defined in claim 5, wherein adjusting the antenna to compensate for the change in the amount of loading of the antenna by the external object through the dielectric rear housing wall comprises adjusting the antenna based on the gathered RSSI values, the stored acquisition times, and the stored wearable electronic device acquisition positions.

7. A method of operating a wearable electronic device having a display formed at a front face of the electronic device, a dielectric rear housing wall formed at a rear face of the electronic device, an antenna, and processing circuitry, the method comprising:
    with the antenna, receiving radio-frequency signals from external equipment through the dielectric rear housing wall;
    with the processing circuitry, gathering information on an amount of loading of the antenna by an external object through the dielectric rear housing wall; and
    with the processing circuitry, adjusting the antenna to compensate for a change in the amount of loading of the antenna by the external object through the dielectric rear housing wall, wherein gathering the information on the amount of loading comprises gathering phase and magnitude measurements of an impedance of the antenna based on radio-frequency signals that are transmitted to the antenna by radio-frequency transmitter circuitry on the wearable electronic device, and adjusting the antenna to compensate for the change in the amount of loading of the antenna by the external object through the dielectric rear housing wall comprises adjusting the antenna based on the gathered phase and magnitude measurements of the impedance of the antenna.

8. A wearable electronic device having opposing front and rear faces, the wearable electronic device comprising:
- a dielectric rear housing wall that forms the rear face of the electronic device;
- a display having a display cover layer that forms the front face of the electronic device;
- an antenna resonating element formed from conductive traces overlapping the dielectric rear housing wall, wherein the antenna resonating element is subject to loading by external objects through the dielectric rear housing wall;
- radio-frequency transceiver circuitry that is configured to transmit and receive radio-frequency signals through the dielectric rear housing wall using the antenna resonating element;
- impedance matching circuitry coupled between the antenna resonating element and the radio-frequency transceiver circuitry; and
- storage and processing circuitry that is configured to adjust the impedance matching circuitry in response to detecting a change in the loading of the antenna resonating element through the dielectric rear housing wall.

9. The wearable electronic device defined in claim 8, further comprising:
- a receive path coupled between the radio-frequency transceiver circuitry and the impedance matching circuitry; and
- receive signal strength measurement circuitry coupled to the receive path, wherein the receive signal strength measurement circuitry is configured to generate receive signal strength information based on radio-frequency signals on the receive path, and the storage and processing circuitry is configured to detect the change in the loading of the antenna resonating element based on the generated receive signal strength information.

10. The wearable electronic device defined in claim 9, wherein the generated receive signal strength information comprises Received Signal Strength Indicator (RSSI) values, acquisition times associated with each of the RSSI values, and wearable electronic device acquisition positions associated with each of the RSSI values.

11. The wearable electronic device defined in claim 10, wherein the storage and processing circuitry is configured to detect the change in the loading of the antenna resonating element by determining whether the RSSI values match a predetermined pattern of RSSI values.

12. The wearable electronic device defined in claim 11, wherein the radio-frequency transceiver circuitry comprises:
- a cellular telephone transceiver that is configured to transmit and receive signals at frequencies between 700 MHz and 960 MHz through the dielectric rear housing wall using the antenna resonating element.

13. The wearable electronic device defined in claim 11, further comprising:
- metal housing sidewalls that extend from the dielectric rear housing wall to the display cover layer;
- a first antenna feed terminal coupled to conductive traces, wherein the conductive traces are patterned onto the dielectric rear housing wall;
- a second antenna feed terminal coupled to the metal housing sidewalls; and
- a radio-frequency transmission line that couples the radio-frequency transceiver circuitry to the first and second antenna feed terminals.

14. The wearable electronic device defined in claim 11, wherein the antenna resonating element is configured to form a waveguide with a wrist of a user while the user wears the wearable electronic device.

15. The wearable electronic device defined in claim 8, further comprising:
- power amplifier circuitry coupled to the radio-frequency transceiver circuitry;
- a radio-frequency coupler coupled between the power amplifier circuitry and the impedance matching circuitry; and
- a feedback path coupled between the radio-frequency coupler and the radio-frequency transceiver circuitry, wherein the storage and processing circuitry is configured to gather phase and magnitude measurements of an impedance of the antenna resonating element based on feedback signals received by the radio-frequency transceiver circuitry from the radio-frequency coupler over the feedback path, and the storage and processing circuitry is further configured to detect the change in the loading of the antenna resonating element based on the gathered phase and magnitude measurements.

16. A method of operating a wearable electronic device having a display formed at a front face of the electronic device, a dielectric rear housing wall formed at a rear face of the electronic device, an antenna, impedance matching circuitry coupled to the antenna, and processing circuitry, the method comprising:
- with the antenna, receiving radio-frequency signals from external equipment through the dielectric rear housing wall;
- with the processing circuitry, gathering and storing Received Signal Strength Indicator (RSSI) values and corresponding RSSI acquisition times based on the received radio-frequency signals;
- with the processing circuitry, accumulating user statistics associated with operation of the wearable electronic device by a user over time;
- with the processing circuitry, processing the accumulated user statistics, the stored RSSI values, and the stored RSSI acquisition times to detect a trigger event; and
- with the processing circuitry, in response to detecting the trigger event, adjusting the impedance matching circuitry.

17. The method defined in claim 16, wherein the accumulated user statistics comprise a user RSSI pattern and processing the accumulated user statistics, the stored RSSI values, and the stored RSSI acquisition times comprises:
- filtering out the user RSSI pattern from the stored RSSI values to generate filtered RSSI values; and
- detecting the trigger event based on the filtered RSSI values.

18. The method defined in claim 17, wherein the user statistics comprise an event RSSI pattern associated with a change in loading of the antenna through the dielectric rear housing wall and detecting the trigger event comprises:
- detecting a sequence of RSSI values in the filtered RSSI values that matches the event RSSI pattern.

19. The method defined in claim 18, wherein adjusting the impedance matching circuitry comprises:
- controlling the impedance matching circuitry to exhibit an adjusted impedance;
- gathering an additional RSSI value from the received radio-frequency signals while the impedance matching circuitry exhibits the adjusted impedance;
- determining whether radio-frequency performance of the antenna has improved based on the gathered additional RSSI value;

in response to determining that the radio-frequency performance of the antenna has not improved, controlling the impedance matching circuitry to exhibit an additional adjusted impedance; and in response to determining that the radio-frequency performance of the antenna has improved, storing a matching setting associated with the adjusted impedance on storage circuitry.

20. The method defined in claim 18, wherein adjusting the impedance matching circuitry comprises:

retrieving a matching setting associated with the event RSSI pattern from storage circuitry on the wearable electronic device, wherein the matching setting identifies an adjusted impedance;

controlling the impedance matching circuitry to exhibit the adjusted impedance;

gathering an additional RSSI value from the received radio-frequency signals while the impedance matching circuitry exhibits the adjusted impedance;

determining whether the additional RSSI value exceeds a minimum RSSI threshold value; and in response to determining that the additional RSSI value does not exceed the minimum RSSI threshold value, controlling the impedance matching circuitry to exhibit an additional adjusted impedance.

\* \* \* \* \*